United States Patent
Sayag et al.

(10) Patent No.: US 11,575,700 B2
(45) Date of Patent: Feb. 7, 2023

(54) SYSTEMS AND METHODS FOR DISPLAYING AN ATTACK VECTOR AVAILABLE TO AN ATTACKER OF A NETWORKED SYSTEM

(71) Applicant: XM Cyber Ltd., Herzelyia (IL)

(72) Inventors: Yehonatan Sayag, Tel Aviv (IL); Gal Ben Ishay, Holon (IL)

(73) Assignee: XM Cyber Ltd., Hertsliya (IL)

(*) Notice: Subject to any disclaimer, the term of this patent is extended or adjusted under 35 U.S.C. 154(b) by 150 days.

(21) Appl. No.: 17/131,524

(22) Filed: Dec. 22, 2020

(65) Prior Publication Data

US 2021/0258334 A1    Aug. 19, 2021

Related U.S. Application Data

(60) Provisional application No. 62/966,037, filed on Jan. 27, 2020.

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
USPC ...................................................... 726/22–25
See application file for complete search history.

(56) References Cited

U.S. PATENT DOCUMENTS

| | | | |
|---|---|---|---|
| 6,574,737 B1 | 6/2003 | Kingsford et al. | |
| 6,711,127 B1 | 3/2004 | Gorman et al. | |
| 6,918,038 B1 | 7/2005 | Smith et al. | |
| 6,952,779 B1 | 10/2005 | Cohen et al. | |
| 7,013,395 B1* | 3/2006 | Swiler | H04L 63/1433 713/153 |
| 7,296,092 B2 | 11/2007 | Nguyen | |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Kambiz Zand
*Assistant Examiner* — Mahabub S Ahmed
(74) *Attorney, Agent, or Firm* — Momentum IP; Marc Van Dyke

(57) ABSTRACT

A method for displaying an attack vector available to an attacker of a networked system including a plurality of network nodes. One or more penetration tests of the networked system are carried out, by a penetration testing system. Based on results of the penetration tests, the attack vector available to an attacker of the networked system is identified. A critical path of the attack vector is determined, and is displayed by displaying the network nodes included in the critical path as a continuous ordered sequence of network nodes. In some embodiments, one or more auxiliary paths of the attack vector may be determined, and may be displayed.

18 Claims, 27 Drawing Sheets

(56) References Cited

U.S. PATENT DOCUMENTS

| | | | |
|---|---|---|---|
| 7,458,098 B2 * | 11/2008 | Judge | H04L 63/1416 713/188 |
| 7,614,083 B2 * | 11/2009 | Khuti | H04L 63/0209 726/22 |
| 7,693,810 B2 | 4/2010 | Donoho et al. | |
| 7,757,293 B2 | 7/2010 | Caceres et al. | |
| 7,926,113 B1 | 4/2011 | Gula et al. | |
| 7,934,254 B2 | 4/2011 | Graham | |
| 7,966,659 B1 | 6/2011 | Wilkinson et al. | |
| 8,001,589 B2 | 8/2011 | Ormazabal et al. | |
| 8,112,016 B2 | 2/2012 | Matsumoto et al. | |
| 8,127,359 B2 | 2/2012 | Kelekar | |
| 8,266,702 B2 | 9/2012 | Naldurg et al. | |
| 8,321,944 B1 | 11/2012 | Mayer et al. | |
| 8,356,353 B2 | 1/2013 | Futoransky et al. | |
| 8,365,289 B2 | 1/2013 | Russ et al. | |
| 8,392,997 B2 | 3/2013 | Chen et al. | |
| 8,490,193 B2 | 7/2013 | Sarraute Yamada et al. | |
| 8,490,196 B2 | 7/2013 | Lucangeli Obes et al. | |
| 8,650,651 B2 | 2/2014 | Podjarny et al. | |
| 8,752,183 B1 | 6/2014 | Heiderich et al. | |
| 8,813,235 B2 | 8/2014 | Sidagni | |
| 8,844,041 B1 | 9/2014 | Kienzle et al. | |
| 8,881,288 B1 * | 11/2014 | Levy | G06F 21/577 709/225 |
| 9,015,301 B2 | 4/2015 | Redlich et al. | |
| 9,015,847 B1 | 4/2015 | Kaplan et al. | |
| 9,076,013 B1 | 7/2015 | Bailey, Jr. et al. | |
| 9,100,430 B1 | 8/2015 | Seiver et al. | |
| 9,183,397 B2 | 11/2015 | Futoransky et al. | |
| 9,215,245 B1 | 12/2015 | Rajab et al. | |
| 9,224,117 B2 | 12/2015 | Chapman | |
| 9,270,696 B2 | 2/2016 | Fritzson et al. | |
| 9,276,952 B2 | 3/2016 | Simpson et al. | |
| 9,292,695 B1 * | 3/2016 | Bassett | G06F 21/577 |
| 9,350,753 B2 | 5/2016 | Kaplan et al. | |
| 9,412,073 B2 | 8/2016 | Brandt et al. | |
| 9,467,467 B2 | 10/2016 | Alamuri | |
| 9,473,522 B1 | 10/2016 | Kotler et al. | |
| 9,558,355 B2 | 1/2017 | Madou et al. | |
| 9,742,788 B2 | 8/2017 | Hassanzadeh et al. | |
| 9,760,716 B1 | 9/2017 | Mulchandani | |
| 9,781,160 B1 | 10/2017 | Irimie et al. | |
| 9,800,603 B1 | 10/2017 | Sidagni | |
| 9,824,222 B1 | 11/2017 | Kaplan et al. | |
| 9,870,715 B2 | 1/2018 | Sadeh-Koniecpol et al. | |
| 9,894,090 B2 | 2/2018 | Hebert et al. | |
| 9,912,687 B1 | 3/2018 | Wescoe et al. | |
| 10,038,711 B1 | 7/2018 | Gorodissky et al. | |
| 10,068,095 B1 | 9/2018 | Segal et al. | |
| 10,108,803 B2 | 10/2018 | Chari et al. | |
| 10,122,750 B2 | 11/2018 | Gorodissky et al. | |
| 10,182,040 B2 | 1/2019 | Hu et al. | |
| 10,257,220 B2 | 4/2019 | Gorodissky et al. | |
| 10,291,643 B2 | 5/2019 | Marquez et al. | |
| 10,367,846 B2 | 7/2019 | Gorodissky et al. | |
| 10,382,473 B1 | 8/2019 | Ashkenazy et al. | |
| 10,412,112 B2 | 9/2019 | Ashkenazy et al. | |
| 10,440,044 B1 | 10/2019 | Zini et al. | |
| 10,447,721 B2 | 10/2019 | Lasser | |
| 10,454,966 B2 | 10/2019 | Gorodissky et al. | |
| 10,462,177 B1 | 10/2019 | Lasser et al. | |
| 10,469,521 B1 | 11/2019 | Segal et al. | |
| 10,498,803 B1 | 12/2019 | Zini et al. | |
| 10,503,911 B2 | 12/2019 | Chari et al. | |
| 10,505,969 B2 | 12/2019 | Gorodissky et al. | |
| 10,534,917 B2 | 1/2020 | Segal | |
| 10,574,684 B2 | 2/2020 | Segal et al. | |
| 10,574,687 B2 | 2/2020 | Lasser | |
| 10,581,895 B2 | 3/2020 | Ashkenazy et al. | |
| 10,637,882 B2 | 4/2020 | Gorodissky et al. | |
| 10,637,883 B1 | 4/2020 | Segal et al. | |
| 10,645,113 B2 | 5/2020 | Gorodissky et al. | |
| 10,652,269 B1 | 5/2020 | Segal et al. | |
| 10,686,822 B2 | 6/2020 | Segal | |
| 10,686,823 B2 | 6/2020 | Gorodissky et al. | |
| 10,880,326 B1 | 12/2020 | Gofman | |
| 10,911,476 B2 | 2/2021 | Gorodissky et al. | |
| 10,999,308 B2 | 5/2021 | Gorodissky et al. | |
| 11,184,385 B2 * | 11/2021 | Hadar | H04L 63/145 |
| 11,277,432 B2 * | 3/2022 | Hassanzadeh | G06F 21/577 |
| 2003/0009696 A1 * | 1/2003 | Bunker, V | H04L 63/1433 726/26 |
| 2003/0140223 A1 | 7/2003 | Desideri | |
| 2003/0195861 A1 | 10/2003 | McClure et al. | |
| 2003/0208616 A1 | 11/2003 | Laing et al. | |
| 2003/0212779 A1 | 11/2003 | Boyter et al. | |
| 2003/0217039 A1 | 11/2003 | Kurtz et al. | |
| 2004/0015728 A1 | 1/2004 | Cole et al. | |
| 2004/0078384 A1 | 4/2004 | Keir et al. | |
| 2004/0095907 A1 | 5/2004 | Agee et al. | |
| 2005/0086502 A1 | 4/2005 | Rayes et al. | |
| 2005/0100157 A1 | 5/2005 | Gray et al. | |
| 2005/0102534 A1 | 5/2005 | Wong | |
| 2005/0193430 A1 * | 9/2005 | Cohen | H04L 63/1433 726/25 |
| 2006/0015943 A1 | 1/2006 | Mahieu | |
| 2006/0218640 A1 | 9/2006 | Lotem et al. | |
| 2007/0011319 A1 | 1/2007 | McClure et al. | |
| 2007/0204347 A1 | 8/2007 | Caceres et al. | |
| 2007/0271360 A1 | 11/2007 | Sahita et al. | |
| 2007/0283007 A1 * | 12/2007 | Keir | G02B 6/12023 709/224 |
| 2008/0092237 A1 | 4/2008 | Yoon et al. | |
| 2008/0104702 A1 | 5/2008 | Choi et al. | |
| 2008/0172716 A1 | 7/2008 | Talpade et al. | |
| 2008/0209567 A1 | 8/2008 | Lockhart et al. | |
| 2008/0256638 A1 | 10/2008 | Russ et al. | |
| 2008/0288822 A1 | 11/2008 | Wu et al. | |
| 2009/0007270 A1 | 1/2009 | Futoransky et al. | |
| 2009/0044277 A1 | 2/2009 | Aaron | |
| 2009/0049553 A1 | 2/2009 | Vasudeva | |
| 2009/0172813 A1 | 7/2009 | Aaron | |
| 2009/0259748 A1 * | 10/2009 | McClure | H04L 63/145 709/224 |
| 2010/0138925 A1 * | 6/2010 | Barai | H04L 63/1433 726/25 |
| 2011/0016513 A1 | 1/2011 | Bailey, Jr. | |
| 2011/0035803 A1 | 2/2011 | Lucangeli Obes et al. | |
| 2011/0061104 A1 | 3/2011 | Sarraute Yamada et al. | |
| 2011/0078507 A1 | 3/2011 | Choi et al. | |
| 2012/0011590 A1 * | 1/2012 | Donovan | H04L 63/1408 726/25 |
| 2012/0174228 A1 | 7/2012 | Giakouminakis et al. | |
| 2012/0255022 A1 | 10/2012 | Ocepek et al. | |
| 2013/0014263 A1 | 1/2013 | Porcello et al. | |
| 2013/0031635 A1 | 1/2013 | Lotem et al. | |
| 2013/0347116 A1 | 12/2013 | Flores et al. | |
| 2014/0007241 A1 | 1/2014 | Gula et al. | |
| 2014/0137257 A1 | 5/2014 | Martinez et al. | |
| 2014/0165204 A1 | 6/2014 | Williams et al. | |
| 2014/0173739 A1 | 6/2014 | Ahuja et al. | |
| 2014/0237606 A1 | 8/2014 | Futoransky et al. | |
| 2014/0328423 A1 | 11/2014 | Agee et al. | |
| 2015/0031332 A1 | 1/2015 | Clark et al. | |
| 2015/0058993 A1 | 2/2015 | Choi et al. | |
| 2015/0237063 A1 | 8/2015 | Cotton et al. | |
| 2016/0044057 A1 | 2/2016 | Chenette et al. | |
| 2016/0134653 A1 | 5/2016 | Vallone et al. | |
| 2016/0147635 A1 | 5/2016 | Schwarzmann | |
| 2016/0205122 A1 * | 7/2016 | Bassett | H04L 63/1416 726/23 |
| 2016/0234251 A1 | 8/2016 | Boice et al. | |
| 2016/0234661 A1 | 8/2016 | Narasimhan et al. | |
| 2016/0248800 A1 | 8/2016 | Ng et al. | |
| 2016/0275289 A1 | 9/2016 | Sethumadhavan et al. | |
| 2016/0342796 A1 | 11/2016 | Kaplan et al. | |
| 2016/0352771 A1 | 12/2016 | Sivan et al. | |
| 2016/0359679 A1 * | 12/2016 | Parandehgheibi | G06F 16/137 |
| 2017/0006055 A1 | 1/2017 | Strom et al. | |
| 2017/0013008 A1 | 1/2017 | Carey et al. | |
| 2017/0019421 A1 | 1/2017 | Hebert et al. | |
| 2017/0046519 A1 * | 2/2017 | Cam | G06F 21/577 |
| 2017/0063886 A1 | 3/2017 | Muddu et al. | |

(56) References Cited

U.S. PATENT DOCUMENTS

| | | |
|---|---|---|
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0214701 A1* | 7/2017 | Hasan ................ H04L 63/1491 |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0346839 A1* | 11/2017 | Peppe ................ H04L 63/1433 |
| 2017/0373923 A1 | 12/2017 | Kazachkov et al. |
| 2018/0018465 A1 | 1/2018 | Carey et al. |
| 2018/0034846 A1 | 2/2018 | Marquez et al. |
| 2018/0103052 A1 | 4/2018 | Choudhury et al. |
| 2018/0219900 A1 | 8/2018 | Gorodissky et al. |
| 2018/0219901 A1* | 8/2018 | Gorodissky ........ H04L 63/1433 |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0330103 A1 | 11/2018 | Chari et al. |
| 2018/0365429 A1 | 12/2018 | Segal |
| 2018/0375892 A1 | 12/2018 | Ganor |
| 2019/0014141 A1 | 1/2019 | Segal et al. |
| 2019/0036961 A1 | 1/2019 | Gorodissky et al. |
| 2019/0068631 A1 | 2/2019 | Ashkenazy et al. |
| 2019/0081974 A1 | 3/2019 | Lasser |
| 2019/0109872 A1* | 4/2019 | Dhakshinamoorthy .................... H04L 43/06 |
| 2019/0149572 A1 | 5/2019 | Gorodissky et al. |
| 2019/0182270 A1 | 6/2019 | Kim |
| 2019/0182286 A1 | 6/2019 | Zini |
| 2019/0245883 A1 | 8/2019 | Gorodissky et al. |
| 2019/0268369 A1 | 8/2019 | Gorodissky et al. |
| 2019/0312903 A1 | 10/2019 | Zini et al. |
| 2019/0364070 A1 | 11/2019 | Zini et al. |
| 2019/0387015 A1 | 12/2019 | Ashkenazy et al. |
| 2020/0099704 A1* | 3/2020 | Lee ................ H04L 41/145 |
| 2020/0106800 A1 | 4/2020 | Gorodissky et al. |
| 2020/0145449 A1 | 5/2020 | Segal et al. |
| 2020/0153852 A1 | 5/2020 | Segal et al. |
| 2020/0177615 A1* | 6/2020 | Grabois ............ H04L 63/1416 |
| 2020/0177617 A1* | 6/2020 | Hadar ................ H04L 63/1433 |
| 2020/0177618 A1* | 6/2020 | Hassanzadeh ........ G06F 21/552 |
| 2020/0236130 A1 | 7/2020 | Gorodissky et al. |
| 2020/0280577 A1 | 9/2020 | Segal et al. |
| 2020/0358805 A1 | 11/2020 | Segal et al. |
| 2021/0026969 A1* | 1/2021 | Hod .................... H04L 63/1425 |
| 2021/0133331 A1* | 5/2021 | Lipkis .................. H04L 63/145 |
| 2021/0144169 A1 | 5/2021 | Lasser |
| 2021/0226984 A1 | 7/2021 | Gorodissky et al. |
| 2021/0258334 A1 | 8/2021 | Sayag et al. |
| 2021/0314341 A1 | 10/2021 | Moskovich |
| 2021/0352095 A1* | 11/2021 | Cam .................... G06N 7/005 |

FOREIGN PATENT DOCUMENTS

| | | |
|---|---|---|
| CN | 104009881 A | 8/2014 |
| EP | 1559008 A | 8/2005 |
| EP | 3079336 A1 | 10/2016 |
| WO | 0038036 A | 6/2000 |
| WO | 2008054982 A | 5/2008 |
| WO | 2010069587 A | 6/2010 |
| WO | 2013087982 A | 6/2013 |
| WO | 2015111039 A | 7/2015 |
| WO | 2016164844 A | 10/2016 |
| WO | 2018156394 A | 8/2018 |

OTHER PUBLICATIONS

CN103916384 Machine Translation (by EPO and Google)—published Jul. 9, 2014 Zhong Li.

CN104009881 Machine Translation (by EPO and Google)—published Aug. 27, 2014 Wang Tian.

Authors: Alhomidi and Reed Title: Attack Graph-Based Risk Assessment and Optimisation Approach International Journal of Network Security & Its Applications (IJNSA), vol. 6, No. 3, May 2014.

* cited by examiner

| Source ID | Target ID | Step Type | Vulnerability | Other Data |
|---|---|---|---|---|
| Node A | Node B | Compromising a node | V1 | ... |
| Node B | Node C | Compromising a node | V2 | ... |
| Node C | Node D | Compromising a node | V3 | ... |
| Node D | Node E | Compromising a node | V4 | ... |
| Node E | Node F | Compromising a node | V5 | ... |
| Node F | Node F | Extracting credentials of U1 | | ... |
| Node B | Node Z | Compromising a node | Using credentials of U1 | ... |

Figure 12B

| Network Node 520 | Attacking Node 522 | Vulnerability 524 | Other Data 526 |
|---|---|---|---|
| Node A (index 0) | None | | ... |
| Node B (index 1) | Node A (index 0) | V1 | ... |
| Node C (index 2) | Node B (index 1) | V2 | ... |
| Node D (index 3) | Node C (index 2) | V3 | ... |
| Node E (index 4) | Node D (index 3) | V4 | ... |
| Node F (index 5) | Node E (index 4) | V5 | ... |
| Node Z (index 6) | Node B (index 1) | Using credentials of U1 | ... |

Figure 12D

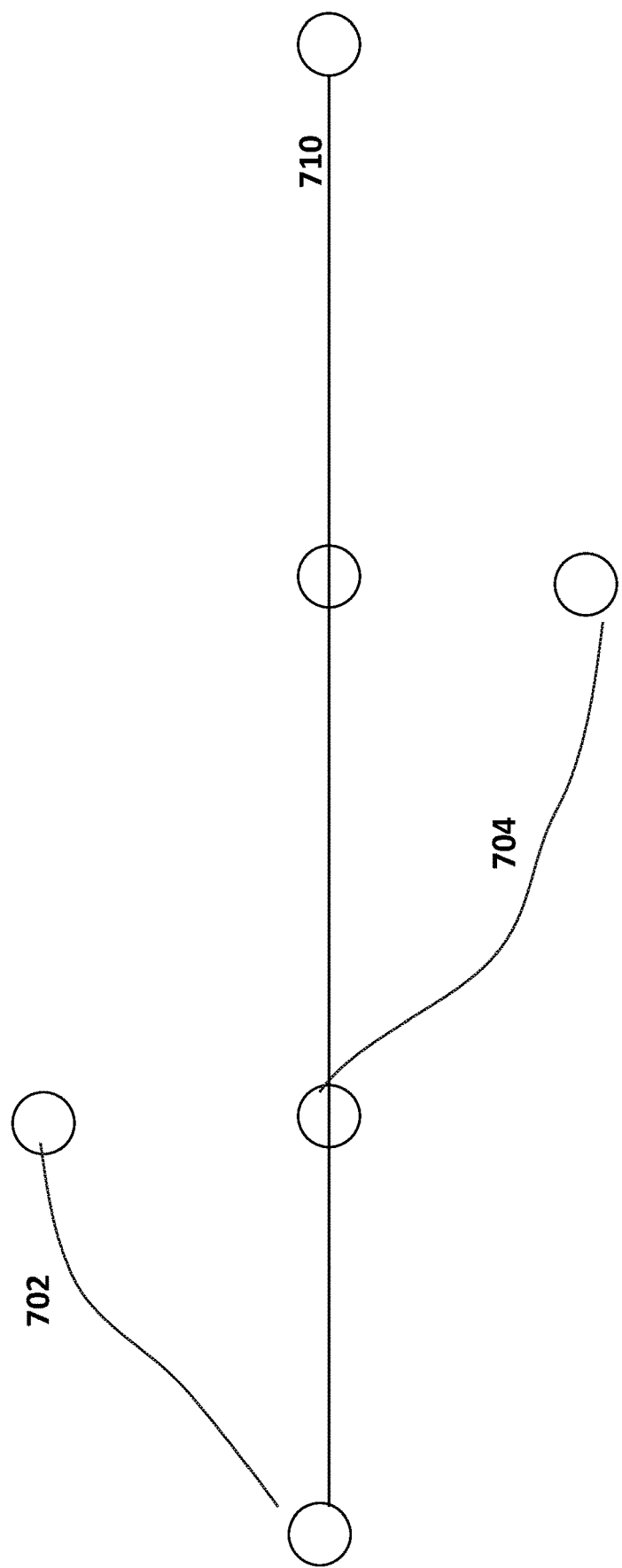

SYSTEMS AND METHODS FOR DISPLAYING AN ATTACK VECTOR AVAILABLE TO AN ATTACKER OF A NETWORKED SYSTEM

RELATED APPLICATIONS

The present application gains priority from U.S. Provisional Patent Application 62/966,037 filed on Jan. 27, 2020 and entitled "Improved Display of an Attack Vector by a Penetration Testing System", which is incorporated herein by reference in its entirety.

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above deficiencies, automated penetration testing solutions were introduced in recent years by several vendors. These automated solutions reduce human involvement in the penetration testing process, or at least in some of its functions. Some of those systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (iii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

FIG. 1A (PRIOR ART) is a block diagram of code modules of a typical penetration testing system. FIG. 1B (PRIOR ART) is a related flow-chart.

FIG. 1A shows a typical prior art penetration testing system and its main functions, where in addition to the three main functions listed above there is also an optional cleanup function. Even though the figures show the reconnaissance, attack and reporting functions as operating in strictly sequential order, this is not necessarily so. For example, the attack and the reporting functions may operate in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

A reconnaissance function is the function within a penetration testing system that handles the collection of data about the tested networked system. The collected data may include internal data of network nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems may employ different types of architectures, each having its advantages and disadvantages. Examples are actual attack penetration testing systems, simulated penetration testing systems and reconnaissance agent penetration testing systems. See the Definitions section for more details about these types of penetration testing systems.

The Problem to Solve

When a penetration testing campaign run by a penetration testing system succeeds in finding a method for an attacker to compromise a tested networked system, the penetration testing system must present the identified method of attack to its user(s). Typically, this is accomplished by displaying an "attack vector" representing a method of attack that can be used by the attacker for compromising the tested networked system.

An attack vector is a set of network nodes connected by attacker steps. The set represents a method for an attacker to move from one or more starting network nodes to an ending network node, as seen, for example, in FIG. 3A. Alternatively, an attack vector can be a set of network nodes connected by vulnerabilities that may be exploited by attacker steps. Here too, the set represents a method for the attacker to move from one or more starting network nodes to an ending network node, as seen, for example, in FIG. 3B, which represents the same exemplary attack vector as that shown in FIG. 3A.

In FIGS. 3A and 3B, the attack vector is represented by a graph, where network nodes are represented by graph nodes and steps or vulnerabilities are represented by graph edges. However, this is not the only way to use a graph for representing an attack vector. As one example, steps or vulnerabilities may also be represented by graph nodes, in which case the graph nodes of the attack vector alternate between representing network nodes and representing steps/vulnerabilities. Furthermore, a graph is not the only way of representing an attack vector. Other forms, such as a textual list, may also be used for the same purpose.

Typically, when displaying an attack vector to a user, the vector's representation explicitly identifies the network nodes as well as the steps or vulnerabilities included in the attack vector. However, in some embodiments, by default the identifications of the steps or vulnerabilities are not displayed, for example in order to avoid cluttering the display. In such embodiments, the user may request information (or additional information) about the steps and/or vulnerabilities, for example by pointing to an edge of a graph on the screen and clicking a mouse or otherwise interacting with the display using an input device. Even if the steps and/or vulnerabilities are not visible when an attack vector is displayed, they are still an inherent part of the attack vector. In the present disclosure, when an attack vector is displayed, the steps or vulnerabilities are always listed as being indicated. However, this should not be construed as limiting the scope of the invention in any way.

When graphically displaying an attack vector to a user, the attack vector is typically displayed from left to right. In other words, the starting network node(s) appear on the left side of the display, and the ending network node appears on the right side. However, this is not mandatory. It is equally legitimate to display an attack vector from right to left, from top to bottom, from bottom to top or in any other direction. In the present disclosure, attack vectors are always displayed from left to right. However, this should not be construed as limiting the scope of the invention in any way.

The starting network node(s) of an attack vector are the network node(s) from which the attacker starts the attack. The ending network node of an attack vector is a network node of the tested networked system, which, when compromised by the attacker, results in achieving the attacker's goal in the current penetration testing campaign. The attacker can make progress towards the goal by moving from one network node in the attack vector to another network node in the attack vector, by carrying out the relevant steps and/or exploiting the relevant vulnerabilities.

A starting network node of an attack vector may be a network node of the tested networked system that is assumed to be compromised when the campaign starts. Alternatively, a starting network node may be a "dummy node" that represents the world outside the tested networked system, as seen for example in FIG. 3C. A dummy node is useful when one does not assume that any network nodes of the tested networked system are already compromised when starting the campaign. Another method for representing an attack vector that starts outside the tested networked system, without explicitly displaying a dummy node, is to display the attack vector as starting with an attacker's step or with a vulnerability that can be exploited by an attacker's step, rather than with a network node, as shown in FIG. 3D, which represents the same attack vector as shown in FIG. 3C.

In the present disclosure, attack vectors are always displayed as beginning with a network node. However, this should not be construed as limiting the scope of the invention in any way.

Let us now turn to the exemplary attack vector of FIG. 3B. Suppose a penetration testing campaign is defined such that:
a. Network node A is assumed to be compromised when starting the campaign. For example, it may be a network node that is accessible from outside the networked system, and is known to have one or more vulnerabilities enabling an attacker to compromise node A.

b. The goal of the attacker of the campaign is to compromise network node Z. For example, node Z may be the computer used by the CFO of the company owning the tested networked system.

An identified attack vector may be:
1. From network node A, compromise network node B by exploiting vulnerability V1;
2. From network node B, compromise network node C by exploiting vulnerability V2;
3. From network node C, compromise network node D by exploiting vulnerability V3; and
4. From network node D, compromise network node Z by exploiting vulnerability V4.

A penetration testing system may display an identified attack vector as a textual list, for example as presented above. Such presentation is satisfactory for a short attack vector, such as in the present example, since in such cases a user can grasp the full picture of the attack from the text. However, an attack vector may be long, for example including several dozens of steps and compromised nodes, in which case grasping the full picture of the attack from the text might be quite difficult.

Most prior art penetration testing systems present an attack vector in a graphical way, either in addition to the textual presentation or in replacement thereof. Typically, a displayed attack vector is presented overlaid over a graphical representation of the tested networked system. In such cases, the communication connectivity structure of the tested networked system is represented by a graph in which each graph node represents a network node and each graph edge represents communication connectivity between the two network nodes corresponding to the two graph nodes associated with the graph edge. Overlaying of an attack vector over the networked system graph is typically accomplished by emphasizing, in the graph, a path corresponding to the displayed attack vector. In some cases, annotations may be added to the relevant graph edges, in order to specify the steps taken by the attacker or the vulnerabilities exploited by the attacker for moving from one network node to another network node.

However, presenting an attack vector overlaid on the graph of the networked system does not ensure that a user can easily grasp the essence of a long attack vector. Even though a graphical presentation is easier to grasp than a textual presentation, the graph of the networked system typically contains a lot of irrelevant information, such as graph nodes corresponding to network nodes that are irrelevant to the attack vector being displayed, which may confuse the user.

One may consider improving the user's grasp by presenting an attack vector as a graph that only includes information relevant to the displayed attack vector, while leaving out all network nodes and/or information that are irrelevant to the displayed attack vector. For example, if this approach is applied to the example of FIGS. 3A to 3D, the graph presented to the user will include a linear sequence of only five graph nodes, corresponding to network nodes A, B, C, D and Z, with connecting graph edges being labelled with vulnerabilities V2, V3 and V4, respectively, as shown in FIG. 3B.

While presenting an attack vector by displaying only the relevant portions thereof indeed improves clarity and the user's comprehension, this solution is unsatisfactory in the general case.

As a second demonstrative example, consider an attack vector whose textual representation is:

A. From network node A, compromise network node B by exploiting vulnerability V1;
B. From network node B, compromise network node C by exploiting vulnerability V2;
C. From network node C, compromise network node D by exploiting vulnerability V3;
D. From network node D, compromise network node E by exploiting vulnerability V4;
E. In network node E, obtain credentials of user U1 from network node F by exploiting vulnerability V5;
F. From network node B, compromise network node G by using the credentials of user U1;
G. From network node G, compromise network node H by exploiting vulnerability V6;
H. From network node H, compromise network node I by exploiting vulnerability V7;
I. From network node I, compromise network node J by exploiting vulnerability V8;
J. In network node J, obtain credentials of user U2 from network node K by exploiting vulnerability V9;
K. From network node H, compromise network node L by using the credentials of user U2; and
L. From network node L, compromise network node Z by exploiting vulnerability V10.

A graphical representation of the attack vector of the second example is shown in FIG. 4.

One thing that differentiates the attack vector of the second example from that of the first example is that the attack vector of the second example is not "linear". A "linear attack vector" is an attack vector corresponding to a method of compromising the networked system in which each step of the method uses the network node most recently compromised for compromising another network node that was not previously compromised. Stated differently, in a linear attack vector, each node is compromised based on compromising of the most recently compromised node, without returning to a node which was compromised earlier in the attack. While the attack vector of the first example, in FIG. 3B, is linear, the attack vector of the second example, in FIG. 4, is not. In the second example, network node B is used twice—first for compromising network node C, and later for compromising network node G. Similarly, network node H is used twice—first for compromising network node I, and later for compromising network node L.

The non-linear nature of the attack vector of FIG. 4 makes it much more difficult for users to grasp. The continuity of the attack vector is broken when it is graphically presented—after dealing with network nodes E and F in step E the attack vector returns to network node B in step F, and after dealing with network nodes J and K in step J the attack vector returns to network node H in step K.

Another issue with the representation method of FIG. 4 is the difficulty of grasping an attack vector that has multiple starting network nodes. Suppose a third exemplary penetration testing campaign, shown in FIG. 5, which is defined such that:
a. Network nodes A and B are assumed to be compromised when starting the campaign—for example, each of network nodes A and B can be accessed from outside the networked system and is known to have one or more vulnerabilities enabling an attacker to compromise it; and
b. The goal of the attacker of the campaign is to compromise network node Z—for example the computer used by the CFO of the company owning the tested networked system.

An identified attack vector, corresponding to the third example, may be:
1. In network node A, obtain credentials of user U1;
2. From network node B, compromise network node C by exploiting vulnerability V1;
3. From network node C, compromise network node D by using the credentials of user U1; and
4. From network node D, compromise network node Z by exploiting vulnerability V2.

As is clear from FIG. 5, the existence of more than one starting network node adds to the complexity of the graphical representation.

Non-linear attack vectors, such as those shown in FIGS. 4 and 5 and other attack vectors that are much more complex than those shown in the examples, are quite common in real-world penetration testing. Therefore, the complexity of non-linear attack vectors creates a serious problem for understanding results of real-world penetration tests.

Consequently, there is a need in the art for a method for presenting an attack vector of a penetration testing campaign to the user in a way that will be easily comprehensible, regardless of the non-linear nature or complexity of the attack vector.

SUMMARY OF THE INVENTION

Some embodiments of the invention relate to methods and systems for displaying an attack vector available for an attacker to compromise a networked system.

According to an aspect of an embodiment of the invention, there is provided a method of displaying an attack vector available to an attacker of a networked system including a plurality of network nodes, the method including:
a. carrying out, by a penetration testing system, one or more penetration tests of the networked system;
b. based on results of the one or more penetration tests of the networked system, identifying the attack vector available to an attacker of the networked system, the attack vector including a first set of network nodes including multiple network nodes of the networked system that can be compromised by the attacker;
c. determining a critical path of the attack vector, the critical path including a second set of network nodes including at least two network nodes of the networked system, wherein the second set of network nodes is a proper subset of the first set of network nodes; and
d. displaying the critical path of the attack vector, the displaying of the critical path including displaying the network nodes included in the critical path as a continuous ordered sequence of network nodes.

In some embodiments, the displaying of the critical path of the attack vector further includes displaying connections between the network nodes included in the critical path, the connections corresponding to attacker steps or to vulnerabilities that can be exploited by the attacker steps.

In some embodiments, the method further includes:
e. determining one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes; and
f. displaying one auxiliary path of the one or more auxiliary paths, the displaying of the one auxiliary path including displaying the network nodes included in the one auxiliary path as a second continuous ordered sequence of network nodes.

In some such embodiments, the displaying of the one auxiliary path further includes displaying connections between the network nodes included in the one auxiliary path, the connections corresponding to attacker steps or to vulnerabilities that can be exploited by the attacker steps.

In some other embodiments, the method further includes:
e. determining one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes; and
f. displaying each auxiliary path of the one or more auxiliary paths, wherein for each given auxiliary path of the one or more auxiliary paths, the displaying of the given auxiliary path includes displaying the network nodes included in the given auxiliary path as a corresponding continuous ordered sequence of network nodes.

In some such embodiments, the displaying of each given auxiliary path of the attack vector further includes displaying connections between the network nodes included in the given auxiliary path, the connections corresponding to attacker steps or to vulnerabilities that can be exploited by the attacker steps.

In some embodiments, the displaying of the critical path of the attack vector includes providing a graphical representation of the critical path.

In some embodiments, the displaying of the critical path of the attack vector includes providing a textual representation of the critical path.

In some embodiments, the determining of the critical path of the attack vector includes representing the attack vector as an array, where each entry in the array corresponds to an attacker step included in the attack vector.

In some embodiments, the determining of the critical path of the attack vector includes representing the attack vector an array, where each entry in the array corresponds to a network node included in the attack vector.

According to an aspect of an embodiment of the invention, there is provided a system of displaying an attack vector available to an attacker of a networked system including a plurality of network nodes, the system including:
a. a penetration testing module including:
  i. one or more penetration testing processors; and
  ii. a penetration testing non-transitory computer readable storage medium for instructions execution by the one or more penetration testing processors, the penetration testing non-transitory computer readable storage medium having stored instructions to carry out one or more penetration tests of the networked system;
b. an attack vector module, including:
  i. one or more attack vector processors; and
  ii. an attack vector non-transitory computer readable storage medium for instructions execution by the one or more attack vector processors, the attack vector non-transitory computer readable storage medium having stored instructions to identify the attack vector available to an attacker of the networked system based on results of the one or more penetration tests of the networked system, the attack vector including a first set of network nodes including multiple network nodes of the networked system that can be compromised by the attacker;
c. a critical path module, including:
  i. one or more critical path processors; and
  ii. a critical path non-transitory computer readable storage medium for instructions execution by the one or more critical path processors, the critical path non-transitory computer readable storage medium having stored instructions to determine a critical path of the attack vector, the critical path including a second set of network nodes including at least two network nodes of the networked system, wherein the second set of network nodes is a proper subset of the first set of network nodes; and
d. a displaying module, including:
  i. one or more displaying processors; and
  ii. a displaying non-transitory computer readable storage medium for instructions execution by the one or more displaying processors, the displaying non-transitory computer readable storage medium having stored instructions to display the critical path of the attack vector, the instructions to display the critical path including instructions to display the network nodes included in the critical path as a continuous ordered sequence of network nodes.

In some embodiments, the instructions to display the critical path of the attack vector further include instructions to display connections between the network nodes included in the critical path, the connections corresponding to attacker steps or to vulnerabilities that can be exploited by the attacker steps.

In some embodiments, the system further includes an auxiliary path module, including:
  i. one or more auxiliary path processors; and
  ii. an auxiliary path non-transitory computer readable storage medium for instructions execution by the one or more auxiliary path processors, the auxiliary path non-transitory computer readable storage medium having stored instructions to determine one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes,
wherein the displaying non-transitory computer readable storage medium further has stored instructions to display one auxiliary path of the one or more auxiliary paths, the instructions to display the one auxiliary path including instructions to display the network nodes included in the one auxiliary path as a second continuous ordered sequence of network nodes.

In some such embodiments, the instructions to display the one auxiliary path further include instructions to display connections between the network nodes included in the one auxiliary path, the connections corresponding to attacker steps or to vulnerabilities that can be exploited by the attacker steps.

In some embodiments, the system further includes an auxiliary path module, including:
  i. one or more auxiliary path processors; and
  ii. an auxiliary path non-transitory computer readable storage medium for instructions execution by the one or more auxiliary path processors, the auxiliary path non-transitory computer readable storage medium having stored instructions to determine one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes, wherein the displaying non-transitory computer readable storage medium further has stored instructions to display each auxiliary path of the one or more auxiliary paths, wherein for each given auxiliary path of the one or more auxiliary paths, the instructions to display the given auxiliary path include instructions to display the network nodes included in the given auxiliary path as a corresponding continuous ordered sequence of network nodes.

In some such embodiments, the instructions to display each given auxiliary path of the attack vector further include instructions to display connections between the network nodes included in the given auxiliary path, the connections corresponding to attacker steps or to vulnerabilities that can be exploited by the attacker steps.

In some embodiments, the instructions to display the critical path of the attack vector include instructions to provide a graphical representation of the critical path.

In some embodiments, the instructions to display the critical path of the attack vector include instructions to provide a textual representation of the critical path.

In some embodiments, the instructions to determine the critical path of the attack vector include instructions to represent the attack vector as an array, where each entry in the array corresponds to an attacker step included in the attack vector.

In some embodiments, the instructions to determine the critical path of the attack vector include instructions to represent the attack vector an array, where each entry in the array corresponds to a network node included in the attack vector.

In some embodiments, the critical path module and the displaying module are implemented as a single module.

In some embodiments, the attack vector module and the critical path module are implemented as a single module.

Unless otherwise defined, all technical and scientific terms used herein have the same meaning as commonly understood by one of ordinary skill in the art to which the invention pertains, unless explicitly defined in this application. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 12B is a schematic illustration of a representation of an array of attacker steps corresponding to the attack vector of FIG. 12A;

FIG. 12D is a schematic illustration of a representation of an array of network nodes, corresponding to the attack vector of FIG. 12A;

FIGS. 17A, 17B, 17C, and 17D, include screen shots of exemplary attack vectors presented in accordance with the present invention.

DESCRIPTION OF SOME EMBODIMENTS OF THE INVENTION

Figure 1A:
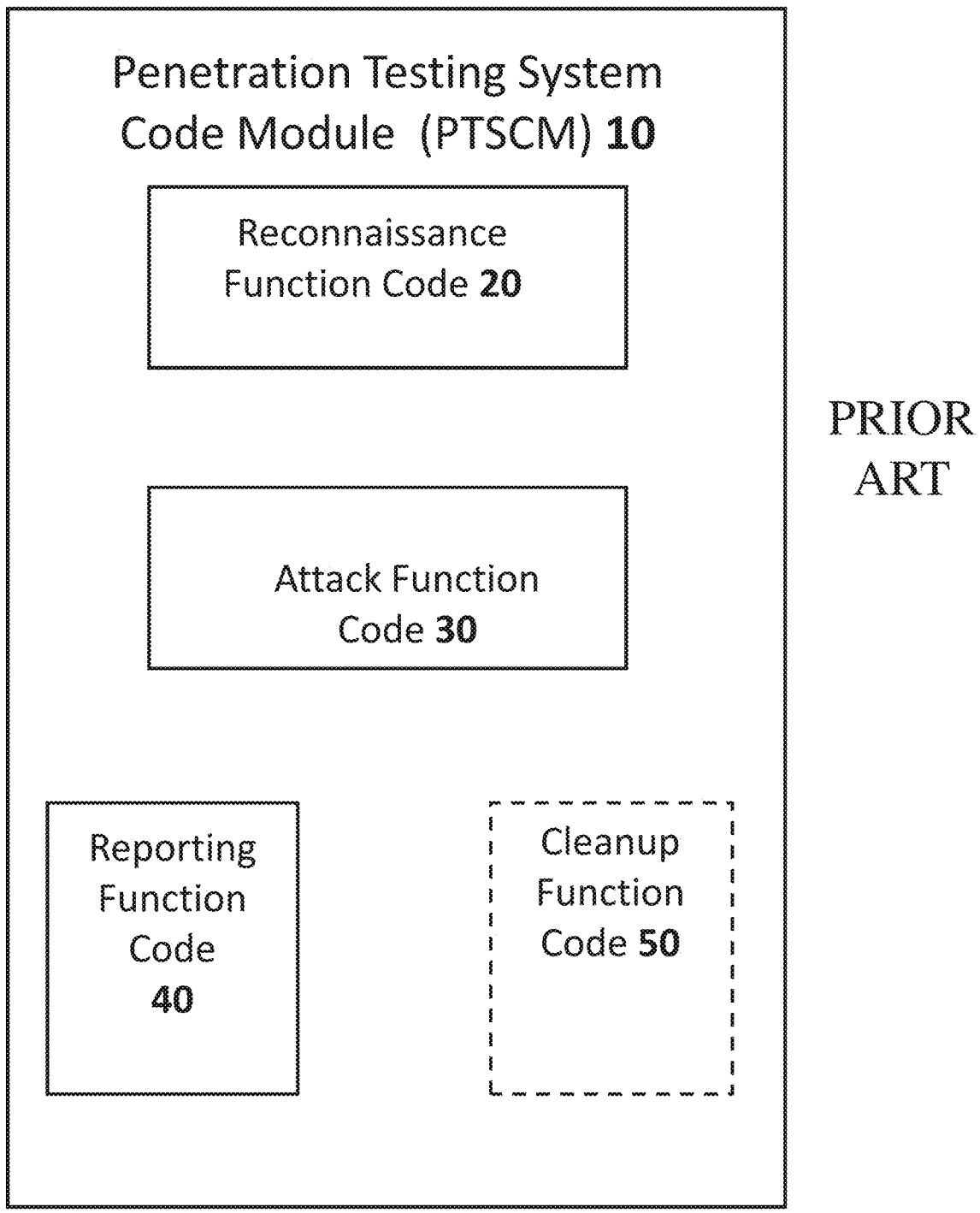
FIG. 1A (PRIOR ART) is a block diagram of code modules of a typical penetration testing system.
Figure 1B:
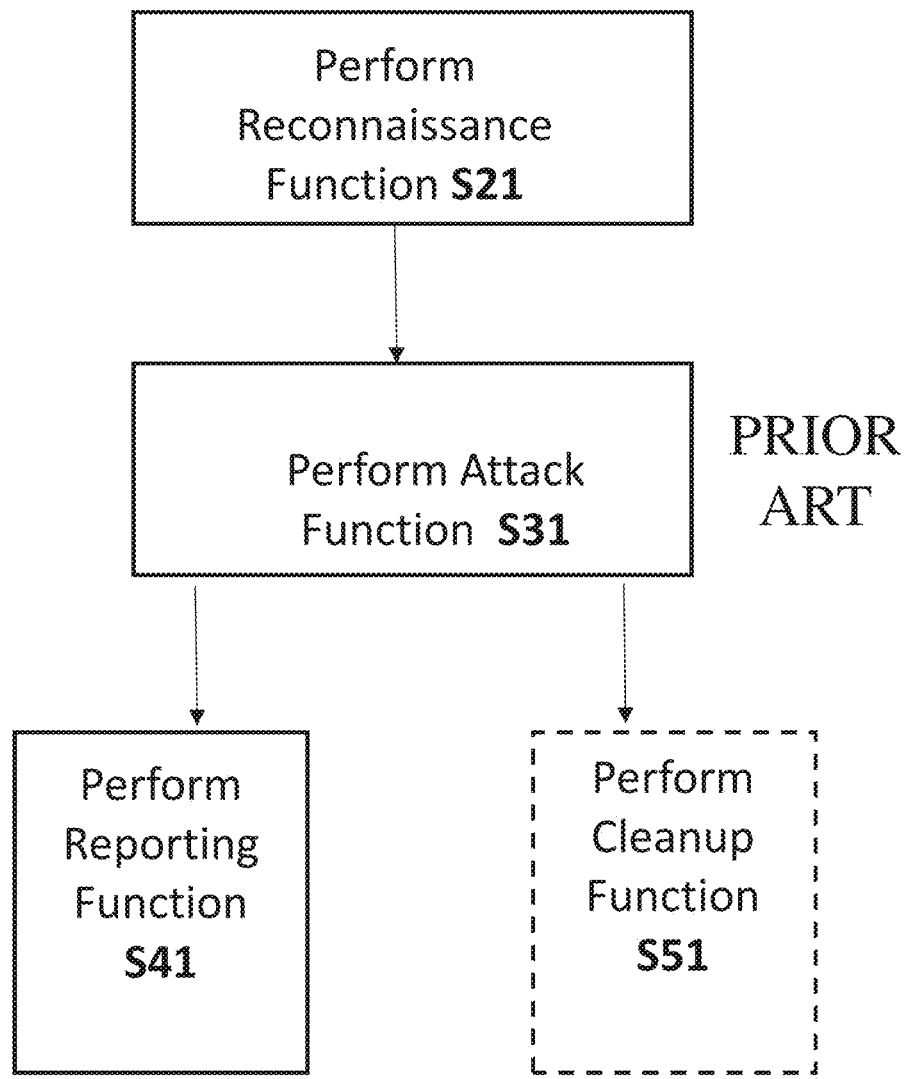
FIG. 1B (PRIOR ART) is a flow-chart related to the system of FIG. 1A.
Figure 2:
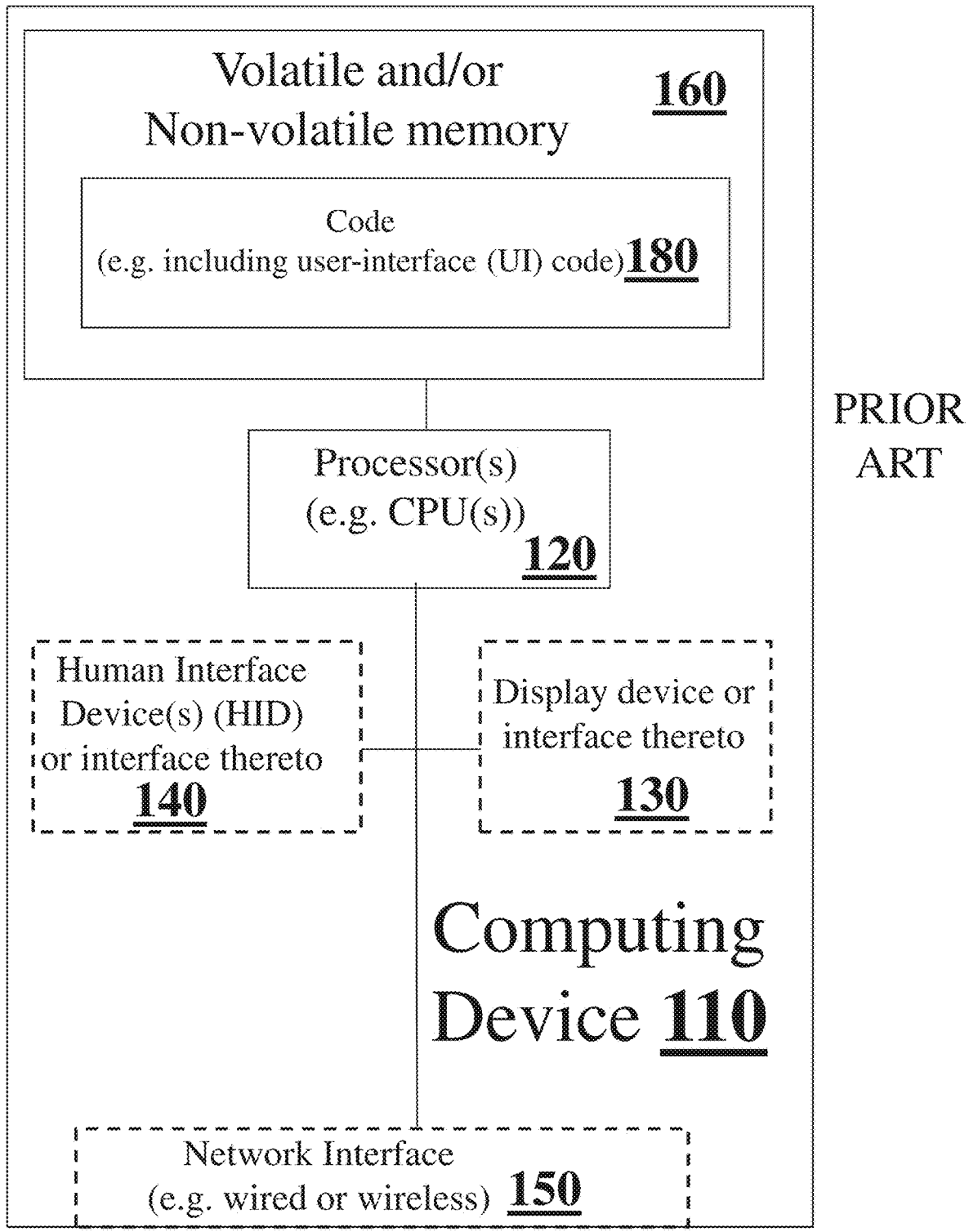
FIG. 2 (PRIOR ART) illustrates a prior art computing device.
Figure 3A:
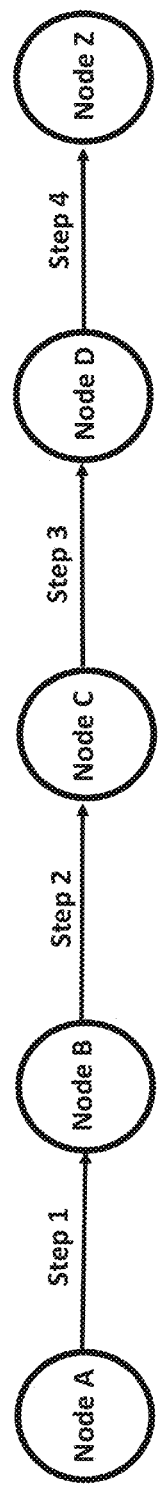
FIGS. 3A, 3B, 3C, and 3D (PRIOR ART) are schematic illustrations of various prior art representations of the same linear attack vector.
Figure 3B:
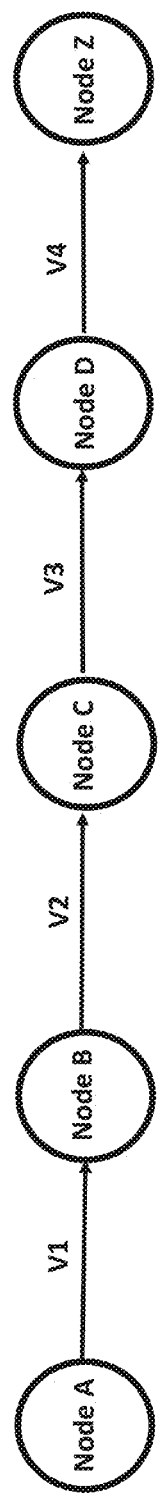
Figure 3C:
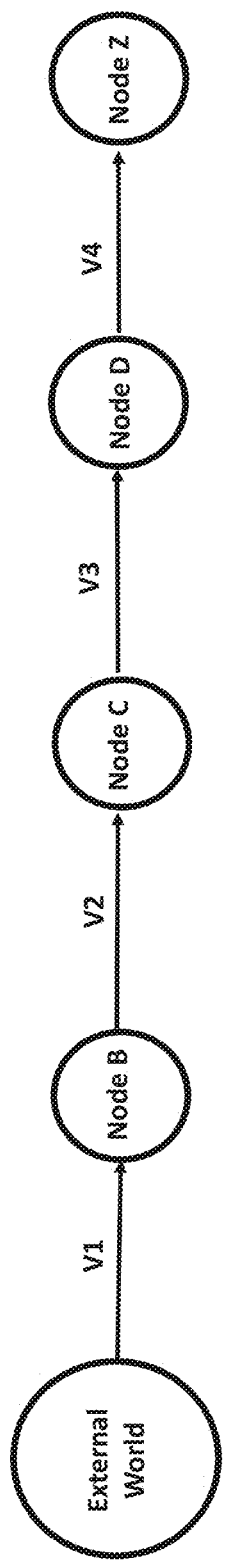
Figure 3D:
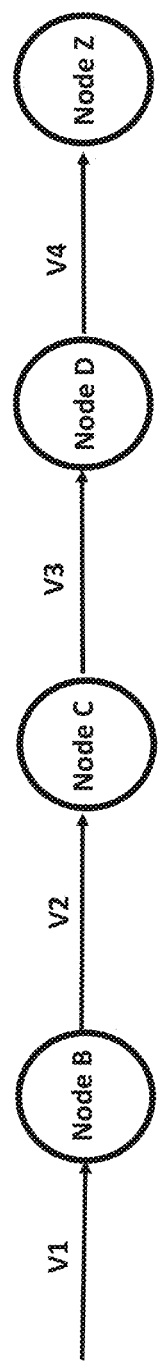

The invention, in some embodiments, relates to methods and systems for displaying an attack vector available for an attacker to compromise a networked system.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically provides a mechanism for displaying an attack vector, and even a non-linear complex attack vector, in a manner which users can easily grasp.

The proposed solution is based on identifying and emphasizing the "critical path" of an identified attack vector, while de-emphasizing elements of the attack vector that are not part of the critical path, which are termed "auxiliary paths" herein.

The critical path of an attack vector is a subset of the attack vector, in the sense that it includes a subset of the network nodes included in the attack vector and a subset of the attacker steps or vulnerabilities connecting the network nodes included in the attack vector. The critical path, according to the present invention, meets several requirements:
  (i) the critical path includes a starting network node of the attack vector;
  (ii) the critical path includes the ending network node of the attack vector; and
  (iii) the attacker's steps connecting the network nodes included in the critical path (or the attacker's steps exploiting the vulnerabilities connecting the network nodes included in the critical path) form an ordered sequence of steps in which:
    (A) the first step of the sequence is carried out from the starting network node of the attack vector, which is included in the critical path;
    (B) the last step of the sequence compromises the ending network node of the attack vector, which is included in the critical path;
    (C) each step in the sequence compromises a network node that was not previously compromised; and
    (D) each step in the sequence (except for the first step of the sequence) is carried out from the network node that was compromised by the immediately preceding step in the sequence.

Clearly, there can be only a single critical path for any given attack vector. Typically, the subset of network nodes included in the critical path is a proper subset of the network nodes included in the attack vector. Only when the attack vector is a linear attack vector, the subset of network nodes included in the critical path can be equal to the set of nodes included in the attack vector.

Figure 4:
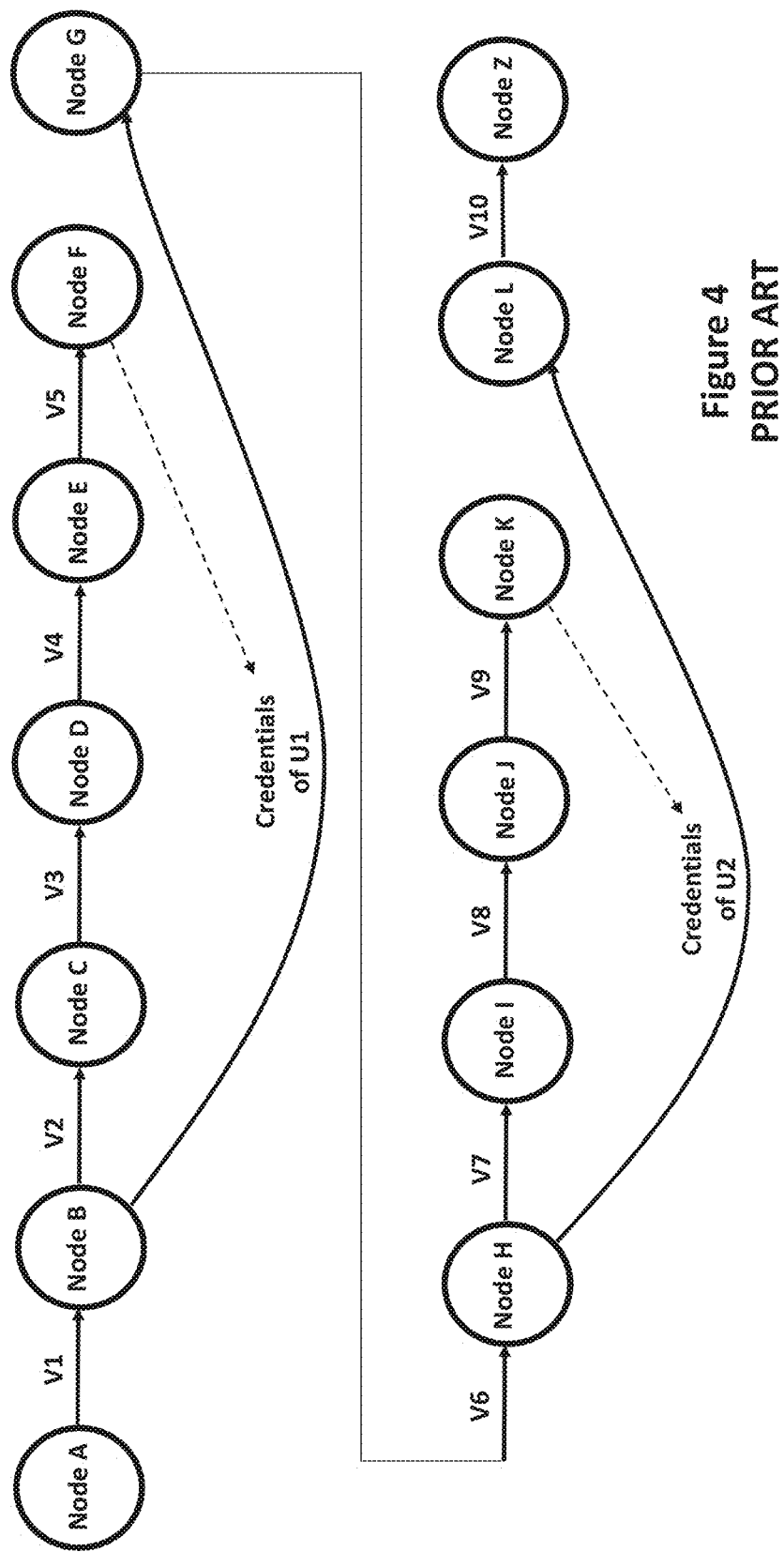
FIG. 4 (PRIOR ART) is a schematic illustration of a prior art representation of a first non-linear attack vector.
Figure 5:
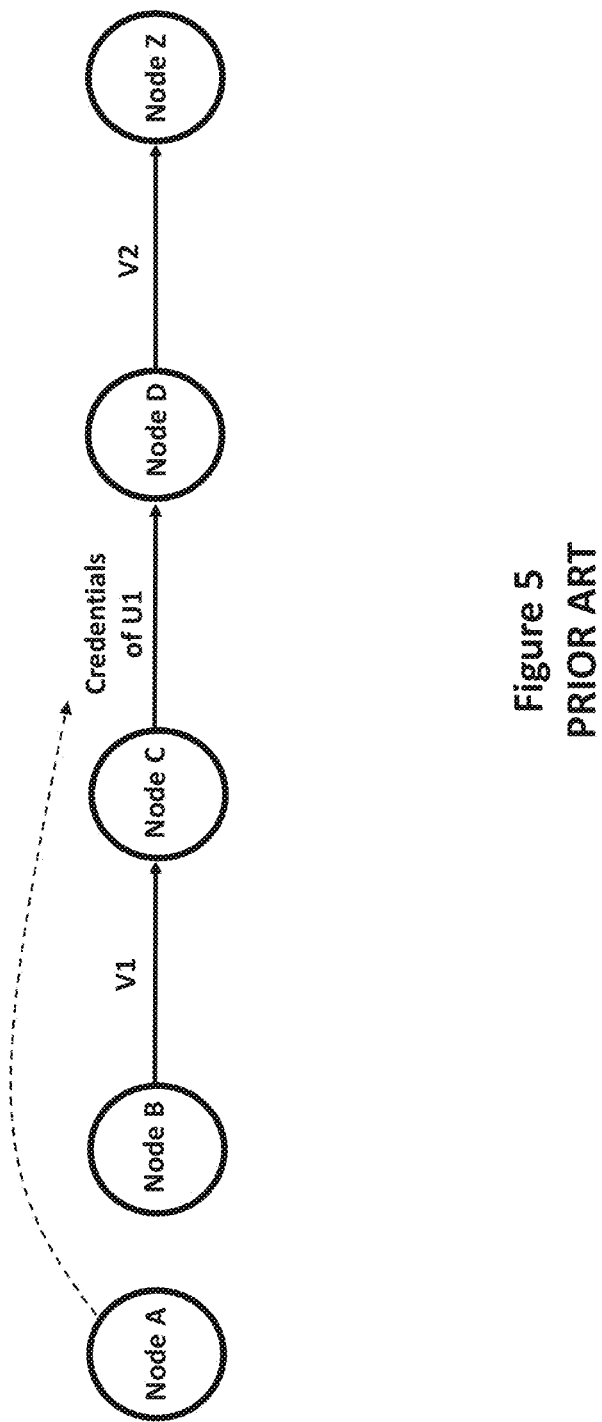
FIG. 5 (PRIOR ART) is a schematic illustration of a prior art representation of a second non-linear attack vector.
Figure 6:
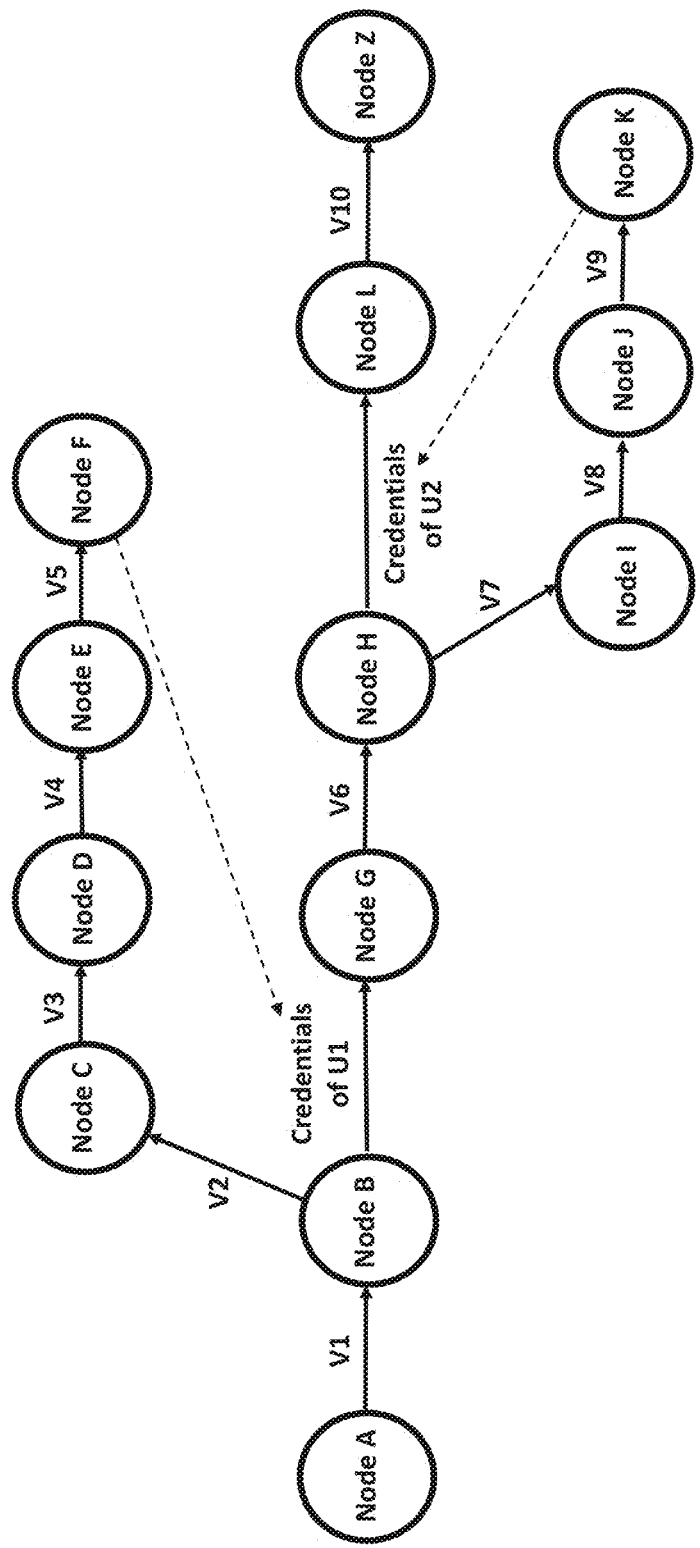
FIG. 6 is a schematic illustration of a representation of the first non-linear attack vector of FIG. 4, according to an embodiment of the present invention.

FIG. 6 shows a graphical representation of the non-linear attack vector of FIG. 4, using the critical path and auxiliary path presentation of the present invention. As seen in FIG. 6, the network nodes included in the critical path are only node A, node B, node G, node H, node L and node Z. All other network nodes of the attack vector belong to auxiliary paths. In other words, the critical path is:
A. From network node A, compromise network node B by exploiting vulnerability V1;
B. From network node B, compromise network node G by using the credentials of user U1;
C. From network node G, compromise network node H by exploiting vulnerability V6;
D. From network node H, compromise network node L by using the credentials of user U2; and
E. From network node L, compromise network node Z by exploiting vulnerability V10;

All other network nodes of the attack vector are included in auxiliary paths. FIG. 6 includes two such auxiliary paths. The first auxiliary path includes node B, node C, node D, node E and node F. The second auxiliary path includes node H, node I, node J and node K.

It is clearly evident from FIG. 6 that the auxiliary paths are indeed "auxiliary"—the sole purpose of each auxiliary path is to obtain an asset or a resource, such as user credentials, that is required for carrying out an attacker step. In the exemplary presentation of FIG. 6, the step for which the asset or resource is required is included in the critical path—for example the step connecting Node B and Node G. However, it is also possible for a first auxiliary path to obtain a resource required for supporting carrying out a step that is included in a second auxiliary path, which second auxiliary path obtains a second resource required for supporting carrying out a third step that is included in a third auxiliary path, and so forth. Such "chaining" of auxiliary paths may continue to any level, as long as the final auxiliary path in the chain obtains a resource required for supporting carrying out a step included in the critical path.

In the exemplary presentation of FIG. 6, network nodes B, C, D, E and F are included in a first auxiliary path whose purpose is to obtain credentials of user U1, in order to enable the step of compromising node G from node B. The four nodes {C, D, E, F} are compromised only for the purpose of obtaining the credentials of user U1, which are then used in compromising node G. Similarly, network nodes H, I, J and K are included in a second auxiliary path whose purpose is to obtain credentials of user U2, in order to enable the step of compromising node L from node H. The three nodes {I, J, K} are compromised only for the purpose of obtaining the credentials of user U2, which are then used in compromising node L.

Once the attack vector to be displayed is separated into a critical path and one or more auxiliary paths, the presentation of the attack vector is constructed as follows:
A. Presenting the nodes and steps/vulnerabilities of the critical path as a linear attack vector would be displayed; and
B. For each auxiliary path, presenting the auxiliary path as emanating out of the first network node of the auxiliary path. For example, see FIG. 6, in which the first auxiliary path emanates from node B and the second auxiliary path emanates from node H.

Optionally, the presentation of an auxiliary path may end in an arrow pointing to the location where the asset or resource obtained by that auxiliary path is used. Such an arrow may point to a node, for instance the node from which the attacker step using the asset/resource is carried out or the node which is attacked by the attacker step using the asset/resource, or to an edge, for instance the edge corresponding to the attacker step using the asset/resource. FIG. 6 shows the resource by an arrow pointing to an edge, as in the latter alternative. It is appreciated that an asset or a resource obtained by an auxiliary path may be used multiple times in the attack vector, and at multiple locations. In such cases, there may be multiple arrows extending from the auxiliary path, to each of those multiple locations at which the asset or resource is used.

In the example of FIG. 6, the resource or asset obtained by each auxiliary path is only used for carrying out steps included in the critical path. However, as mentioned above, a resource or asset obtained by an auxiliary path may also be used in another auxiliary path.

Figure 7:
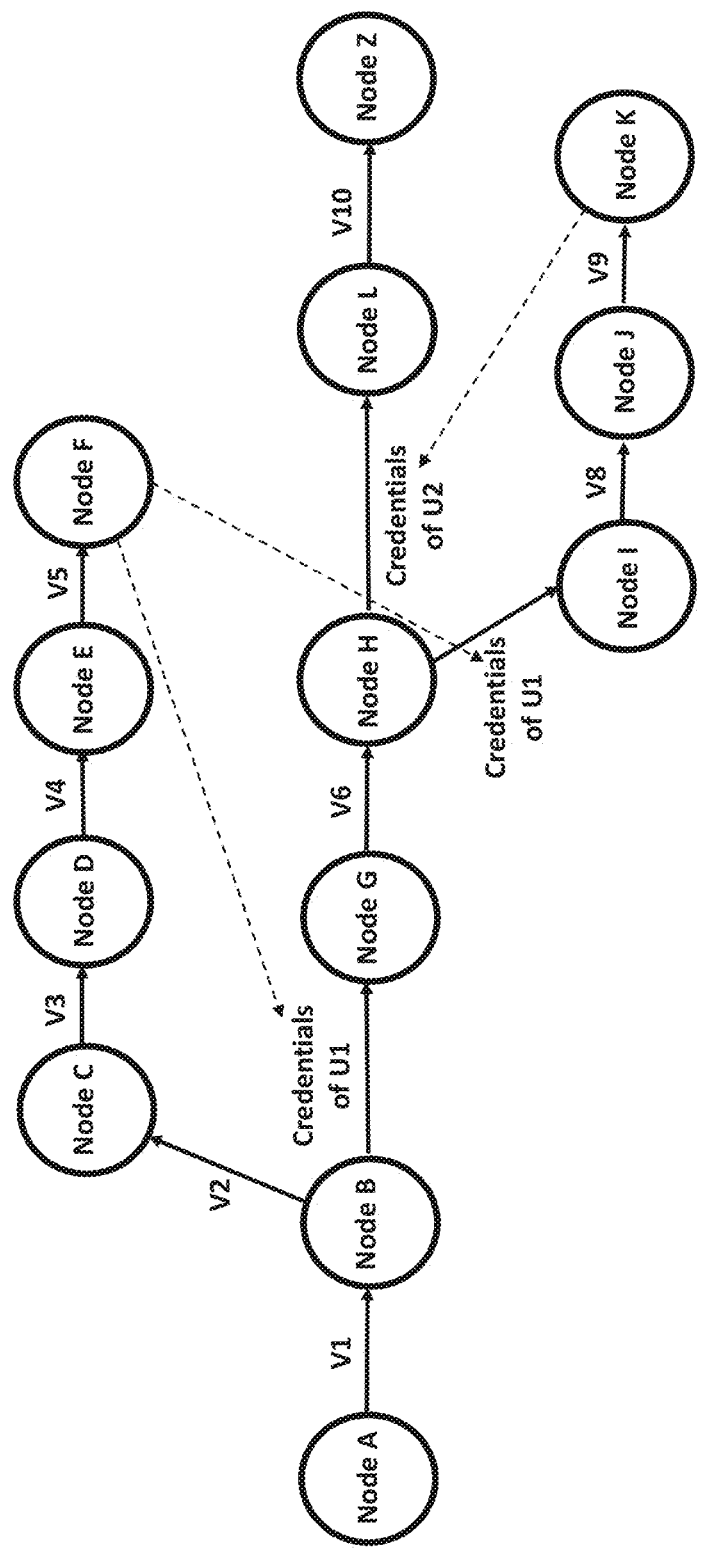
FIG. 7 is a schematic illustration of a representation of a non-linear attack vector similar to the attack vector of FIG. 4, according to an embodiment of the present invention.

FIG. 7 shows a representation of a non-linear attack vector similar to that of FIG. 6. However, in FIG. 7, the resource obtained by the first auxiliary path (which includes network nodes B, C, D, E and F), namely the credentials of user U1, is used in the critical path as well as in the second auxiliary path (which includes network nodes H, I, J and K). In other examples, the resource/asset obtained by a first auxiliary path may be used only in other auxiliary path(s) and not in the critical path.

It is appreciated that a node included in the critical path, which is the starting point of an auxiliary path, and a node in which the asset/resource obtained by that auxiliary path is used, may be the same node. In the example of FIG. 6, the first auxiliary path (containing nodes B, C, D, E and F) emanates from node B and is used in a step moving from node B to node G. Similarly, the second auxiliary path (containing nodes H, I, J and K) emanates from node H and is used in a step moving from node H to node L. However, this is not mandatory, and the resource/asset may be used in a node different from the node from which the auxiliary path for obtaining that resource/asset emanates.

When implementing the proposed solution, one must identify the critical path and the auxiliary paths (if any) of an attack vector, which is found by the attack function of the penetration testing system. Any data structure may be used for representing the attack vector and any algorithm may be used in processing the attack vector for identifying the critical path and the auxiliary paths.

Figure 8:
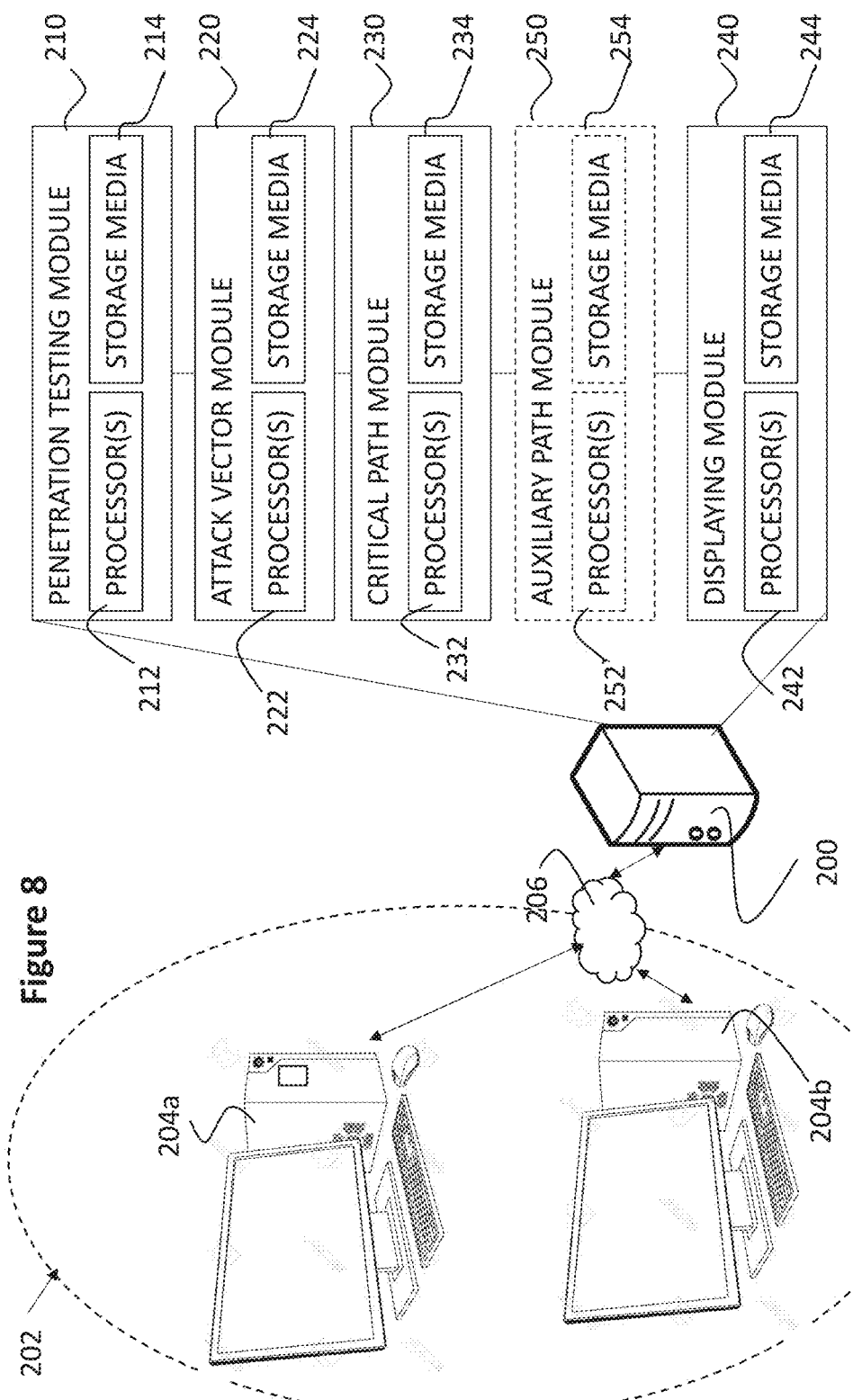
FIG. 8 is a schematic illustration of a system for displaying an attack vector available to an attacker of a networked system, according to an embodiment of the present invention.

Reference is now made to FIG. 8, which is a schematic illustration of a system 200 of displaying an attack vector available to an attacker of a networked system 202, according to an embodiment of the invention.

As seen in FIG. 8, the networked system 202 (indicated by a dashed oval in FIG. 8) includes a plurality of network nodes interconnected by one or more networks. In the illustrated embodiment, a first network node 204a and a second network node 204b are interconnected by a network 206. Typically, each of network nodes 204a and 204b includes one or more processors. Networked system 202 is in electronic communication, for example via network(s) 206, with system 200.

System 200 includes:
  A penetration testing module 210 for determining compromisability of networked system 202. Penetration testing module 210 includes one or more penetration testing processors 212 and one or more penetration testing storage media 214. Penetration testing storage media 214 have stored instructions to carry out one or more penetration tests of networked system 202.

An attack vector module 220, including one or more attack vector processors 222 and one or more attack vector storage medial 224. Attack vector storage media 224 have stored instructions to identify an attack vector available to an attacker of networked system 202 based on results of the one or more penetration tests run by penetration testing module 210. The identified attack vector includes a first set of network nodes including multiple network nodes of the networked system 202 that can be compromised by the attacker.

A critical path module 230, including one or more critical path processors 232 and one or more critical path storage media 234. Critical path storage media 234 have stored instructions to determine a critical path of the attack vector identified by attack vector module 220. The critical path includes a second set of network nodes including at least two network nodes of the networked system. The second set of network nodes may be a proper subset of the first set of network nodes; and a displaying module 240, including one or more displaying processors 242 and one or more displaying storage media 244. The displaying storage media 244 have stored instructions to display the critical path of the attack vector. The instructions to display the critical path comprise instructions to display the network nodes included in the critical path as a continuous ordered sequence of network nodes. Compromising all the network nodes included in the critical path sequence, according to the order of the sequence, results in compromising the networked system 202.

The storage media 214, 224, 234, and 244 are typically non-transitory computer readable storage media.

In some embodiments, the instructions to the display the critical path, included in the displaying storage media 244, include instructions to display connections between the network nodes included in the critical path, which connections correspond to attacker steps or to vulnerabilities that can be exploited by the attacker steps.

In some embodiments, system 200 further includes an auxiliary path module 250, including one or more auxiliary path processors 252 and one or more auxiliary path storage media 254. The auxiliary path storage media 254 have stored instructions to determine one or more auxiliary paths of the attack vector. For each given auxiliary path: (i) the given auxiliary path includes a corresponding third set of network nodes of the networked system, and (ii) the corresponding third set of network nodes included in the given auxiliary path is a proper subset of the first set of network nodes. In such embodiments, the displaying storage media 244 further have stored instructions to display one auxiliary path of the one or more auxiliary paths, or each of the identified auxiliary paths. The instructions to display the auxiliary path(s) include instructions to display the network nodes included in the one auxiliary path or in each of the auxiliary paths as a second continuous ordered sequence of network nodes. In some such embodiments, the instructions to display the auxiliary path(s) further include instructions to display connections between the network nodes included in the one auxiliary path or in each of the auxiliary paths, the connections corresponding to attacker steps or to vulnerabilities that can be exploited by the attacker steps.

In some embodiments, the instructions to display the critical path of the attack vector, stored in displaying storage media 244, include instructions to provide a graphical representation of the critical path. In some embodiments, the instructions to display the critical path of the attack vector, stored in displaying storage media 244, include instructions to provide a textual representation of the critical path.

In some embodiments, the instructions to determine the critical path of the attack vector, stored in critical path storage media 230, include instructions to represent the attack vector as an array, where each entry in the array corresponds to an attacker step included in the attack vector. In some embodiments, the instructions to determine the critical path of the attack vector, stored in critical path storage media 230, include instructions to represent the attack vector as an array, where each entry in the array corresponds to a network node included in the attack vector.

In some embodiments, the critical path module 230 and the displaying module 240 form a single module. In such embodiments, a single storage medium may store the instructions stored in critical path storage media 234 and in displaying storage media 244, and one or more joint processors may process the instructions stored in the single storage medium, thus corresponding to critical path processor(s) 232 and displaying processor(s) 242. In some such embodiments, in which system 200 further includes the auxiliary path module 250, the auxiliary path module 250 may also form part of the single module including the critical path module 230 and the displaying module 240.

In some embodiments, the attack vector module 220 and the critical path module 230 form a single module. In such embodiments, a single storage medium may store the instructions stored in attack vector storage media 224 and in critical path storage media 234, and one or more joint processors may process the instructions stored in the single storage medium, thus corresponding to attack vector processor(s) 222 and critical path processor(s) 232. In some such embodiments, in which system 200 further includes the auxiliary path module 250, the auxiliary path module 250 may also form part of the single module including the attack vector module 220 and the critical path module 230.

Figure 9:
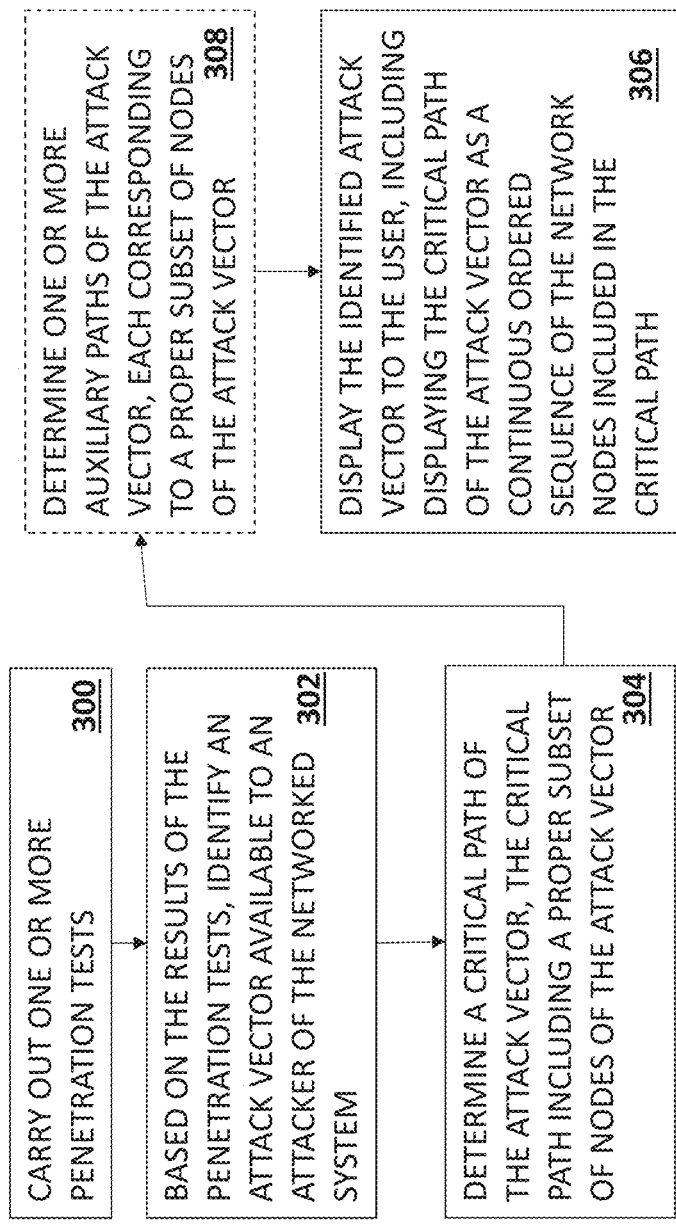
FIG. 9 is a flow chart of a method for displaying an attack vector available to an attacker of a networked system, according to an embodiment of the present invention.

Reference is now additionally made to FIG. 9, which is a flow chart of a method for displaying an attack vector available to an attacker of a networked system, according to an embodiment of the invention. In some embodiments, the method of FIG. 9 may be implemented using the system 200 of FIG. 8, with respect to networked system 202.

At step 300, one or more penetration tests of the networked system are carried out, for example by penetration testing processor(s) 212 executing instructions stored in penetration testing storage media 214 of the penetration testing module 210. The results of the penetration tests identify a method for an attacker to compromise the networked system 202.

Based on the results of the penetration tests, at step 302, the attack vector available to an attacker of networked system 202 is identified, for example by attack vector processor(s) 222 executing instructions stored in attack vector storage media 224. The identified attack vector includes a first set of network nodes, including multiple network nodes of the networked system that can be compromised by the attacker. Exemplary methods for representing the attack vector, identified at step 302, are described hereinbelow, for example with respect to FIG. 10.

At step 304, a critical path of the attack vector is determined. The critical path includes a second set of network nodes, including at least two network nodes of the networked system, wherein the second set of network nodes is a proper subset of the first set of network nodes. In some embodiments, determining the critical path at step 304 includes representing the attack vector as an array, where each entry in the array corresponds to an attacker step included in the attack vector. In some embodiments, determining the critical path at step 304 includes representing the attack vector as an array, where each entry in the array corresponds to a network node included in the attack vector.

Exemplary methods for determining a critical path of an attack vector are discussed hereinbelow with respect to FIGS. 11 to 13.

At step 306, the identified attack vector is displayed to a user. Displaying of the attack vector includes displaying the critical path of the attack vector, which includes displaying the network nodes included in the critical path as a continuous ordered sequence of network nodes. The critical path is displayed such that if an attacker were to start at the starting node, and compromise each node in the critical path, in the displayed order, the attacker's goal would be reached.

In some embodiments, displaying of the critical path at step 306 includes displaying connections between the network nodes included in the critical path, where the connections correspond to attacker steps or to vulnerabilities that can be exploited by the attacker steps. In some embodiments, displaying of the critical path at step 306 includes providing a graphical representation of the critical path. In some embodiments, displaying of the critical path includes providing a textual representation of the critical path.

In some embodiments, the method comprises an additional step 308, in which one or more auxiliary paths of the attack vector are determined. For each such determined auxiliary path: (i) the auxiliary path includes a corresponding third set of network nodes of the networked system, and (ii) the corresponding third set of network nodes included in the auxiliary path is a proper subset of the first set of network nodes included in the attack vector.

Exemplary methods for determining an auxiliary path of an attack vector are discussed hereinbelow with respect to FIGS. 14 and 15.

In some such embodiments, at step 306, when displaying the attack vector, one or all of the determined auxiliary paths are displayed in addition to displaying the critical path. The display of each displayed auxiliary path includes displaying the network nodes included in that auxiliary path as a second continuous ordered sequence of network nodes. In some embodiments, the display of each displayed auxiliary path further includes displaying connections between the network nodes included in that auxiliary path, where the connections correspond to attacker steps or to vulnerabilities that can be exploited by the attacker steps.

Figure 16:
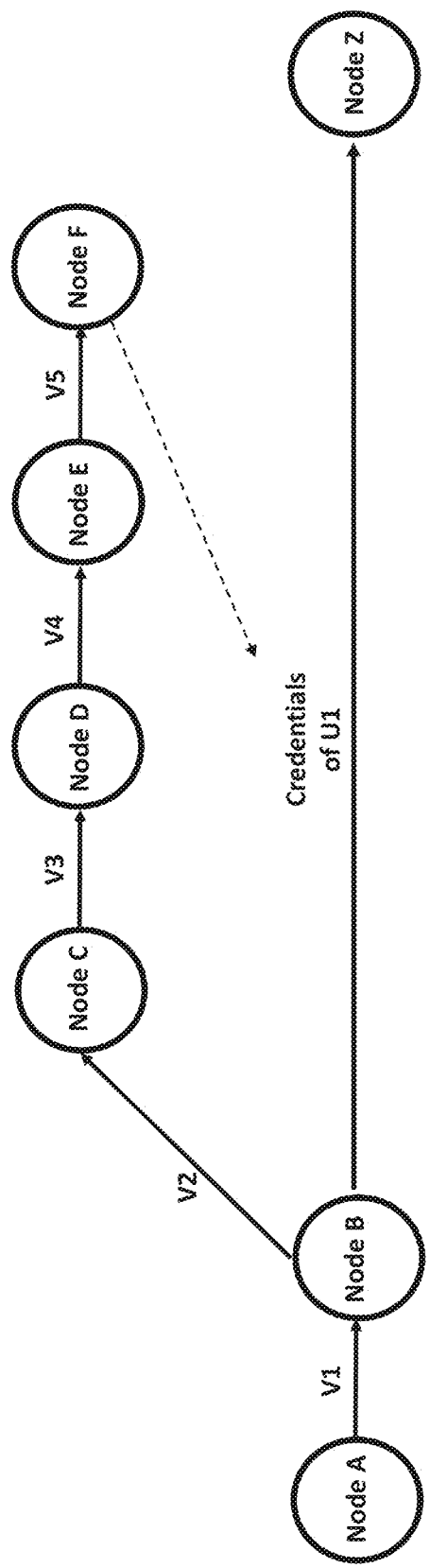
FIG. 16 is a schematic illustration of a representation of the attack vector of FIG. 12A, using the method of FIGS. 11, 14, and 15, according to an embodiment of the present invention.

Exemplary methods for displaying an auxiliary path of an attack vector are discussed hereinbelow with respect to FIGS. 6 and 7, as well as with respect to FIGS. 16 to 17D.

Figure 10:
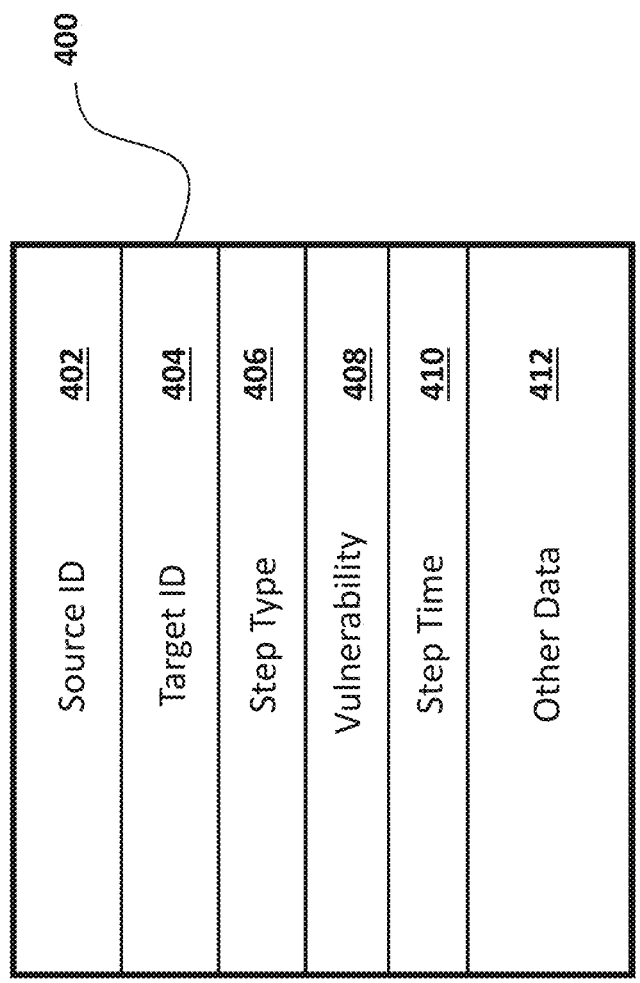
FIG. 10 is a schematic illustration of a representation of an attack vector in an array, according to an embodiment of the present invention.

Reference is now made to FIG. 10, which schematically shows an exemplary implementation in which an attack vector is represented in an array 400.

In one implementation example, the attack vector, as generated by an attack function of a penetration testing system or specifically by attack vector module 220 (FIG. 8) at step 302 (FIG. 9), is represented as an array. Each item in the array corresponds to an attacker step determined to be available to the attacker during the penetration testing campaign. Each array item (i.e. each attacker step) is associated with multiple data items, including:

i. An ID of the network node from which the attacker step is carried out, labeled as Source ID 402. If the attacker step is carried out from outside the tested networked system, then the Source ID field is assigned a special value indicating this special case.

ii. An ID of the network node affected by the attacker step, labeled as Target ID 404. The network node affected by the attacker step may be the same as the network node from which the attacker step is carried out. This is the case, for example, when user credentials are extracted from a network node after it was compromised in a previous step.
iii. The type of the attacker step—for example compromising a network node, extracting user credentials from an already-compromised node, operating a resource controlled by an already-compromised node, and the like, labeled as Step Type 406.
iv. The vulnerability exploited by the attacker step, labeled as Vulnerability 408.
v. Time of occurrence of the attacker step within the campaign, labeled as Step Time 410. The time can be given as an absolute time, for example a certain date-hour-minute-second combination, or as a relative time since the beginning of the campaign, for example as an hour-minute-second combination from the beginning of the campaign.
vi. Other data about the attacker step, which is not important for the identification of the critical and auxiliary paths, labeled as Other Data 412.

An array representing the attack vector, such as that shown in FIG. 10, may include many data items. It is appreciated that the array need not necessarily be ordered in any specific way, such as according to step time or according to network node IDs. Specifically, the disorder of the array may occur because the attack function of the penetration testing system may construct the array on the fly, while exploring the tested networked system according to the lateral movement strategy employed in the penetration testing campaign. However, in some embodiments, in which the attack vector is identified following completion of the penetration testing campaign, such as by attack vector module 220, the array may be ordered at, or shortly after, the time of creation thereof.

Figure 11:
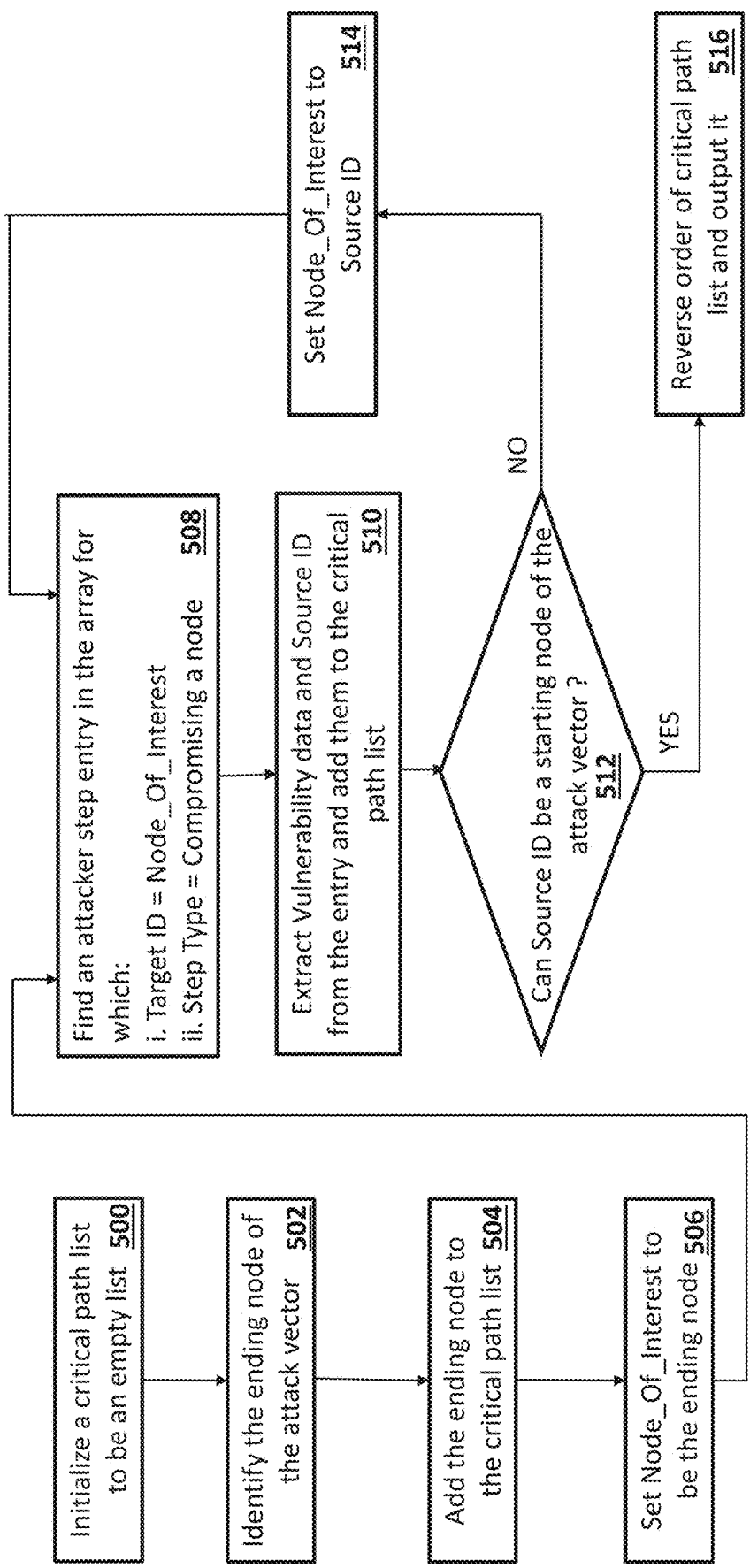
FIG. 11 is a flow chart of a first embodiment of a method for identifying the critical path of an attack vector, as part of the method of FIG. 9, according to an embodiment of the present invention.

Reference is now made to FIG. 11, which is a flowchart of a method for identifying the critical path of an attack vector, for example by the critical path module 230 (FIG. 8) when executing step 304 (FIG. 9). In the method shown in FIG. 11, the critical path is initially generated in reverse order—from the ending node of the critical path to the starting node of the critical path, and the generated path is then reversed prior to presentation thereof.

Initially, at step 500, a critical path list is initialized to be an empty list. The critical path will be gradually constructed by adding vulnerabilities and network nodes to the list.

At step 502, the ending node of the attack vector is identified. This may be achieved by identifying the network node that is defined as the goal of the penetration testing campaign, or that contains a resource that is defined as the goal of the penetration testing campaign. An attack vector must end in achieving the goal of the campaign, and therefore the ending node of the attack vector must be associated with the goal defined for the campaign.

The identified ending node is added to the previously empty critical path list at step 504, in order for the critical path to include the ending node, as required by the definition of a critical path above. At this stage the critical path list contains a single member—the ending node.

At step 506, a variable, here titled Node_Of_Interest, is set to be equal to the ID number of the ending node identified in step 502. The variable is used to indicate which network node is the next one to be searched in entries of the array of attacker steps.

At step 508, the array of attacker steps is searched for an entry that satisfies the following conditions:

i. The Target ID field of the entry is equal to Node_Of_Interest—i.e. this is an attacker step entry that attacks the network node currently being the Node_Of_Interest; and
ii. The "Step Type" field of the entry indicates this attacker step corresponds to compromising a network node.

In a valid attack vector, there must exist an entry in the array of attacker steps that satisfies the above two conditions, because a valid attack vector must include an attacker step that compromises the ending node. Otherwise, the attack vector would not represent a successful attack that achieves the goal of the campaign. Additionally, in a valid attack vector, there is only one entry in the array that satisfies the two conditions, because once an attacker succeeds in compromising the ending node, the campaign will end. Thus, the ending node can be compromised only once, and therefore there cannot be two entries in the array that correspond to an attacker step that compromises the ending node. Consequently, the result of the search at step 508 must be deterministic and unique.

At step 510, the vulnerability data and the Source ID fields are extracted from the attacker step entry that satisfied the two conditions, and are added to the critical path list. At this stage the critical path list contains:
 a. the ending node;
 b. the vulnerability used for compromising the ending node; and
 c. the node used as a source for compromising the ending node (the network node corresponding to the source ID added to the list).

At step 512, it is evaluated whether the network node corresponding to the Source ID extracted in the previous step, and included in the critical path list, can be a starting node of the attack vector. This may be achieved by identifying the network node(s) of the tested networked system that were defined to be already compromised at the start of the campaign, and then checking whether Source ID is equal to the ID of one of these initial already-compromised nodes. If the Source ID field contains the special value indicating an attacker step carried out from outside the tested networked system, then, obviously, the node corresponding to the Source ID field can be a starting node of the attack vector.

If the node corresponding to the Source ID cannot be a starting node of the attack vector, at step 514 the variable Node_Of_Interest is set to be equal to Source ID, and the flow returns to step 508, where the attacker step used to compromise the new node of interest is searched in the attacker step array.

When repeating step 508, the array of attacker steps is once again searched for an entry that satisfies the two conditions specified above. However, the Node_Of_Interest variable now contains the ID of the network node that was most recently added to the critical path list. As such, when finding an entry that satisfies the conditions, it is known that the Source ID of that entry is the network node from which the node corresponding to the current Node_Of_Interest can be compromised. Therefore, after completing step 510 a second time, the critical path list contains:
 a. the ending node;
 b. the vulnerability used for compromising the ending node;
 c. the node used for compromising the ending node ($2^{nd}$ to last node in the critical path);
 d. the vulnerability used for compromising the $2^{nd}$ to last node in the critical path; and
 e. the node used for compromising the $2^{nd}$ to last node.

It is appreciated that, for reasons similar to those explained above, in each iteration of searching for a suitable attacker step, there must exist an entry in the array of attacker steps that satisfies the conditions, and there must be only one such entry. Consequently, the result of each such iteration is deterministic and unique, not only for the initial ending node iteration but for every other iteration.

The flow continues through steps 508, 510, 512 and 514 as described hereinabove, until an iteration in which, at step 512, it is determined that the newly found Source ID can be a starting node of the attack vector. In other words, the iterations continue until the answer to the question in step 512 is YES.

When, at step 512, it is determined that the identified Source ID can be a starting node of the attack vector, it is known that the beginning of the attack vector has been reached, and no further iterations are required. As a result, at step 516, the order of the critical path list is reversed so as to have the starting node at the beginning of the list and the ending node at the end of the list, and the resulting critical path list is provided as the critical path of the attack vector.

The reason for reversing the critical path list is that, as mentioned above, the method of FIG. 11 constructs the critical path "backwards", from its end to its beginning. The path construction starts with the ending node, and in each iteration a vulnerability and a node are added to the end of the critical path (list). The last node to be added is a starting node of the attack vector. Therefore, the resulting list is generated in the opposite order and must be reversed before being used for display purposes.

Figure 12A:
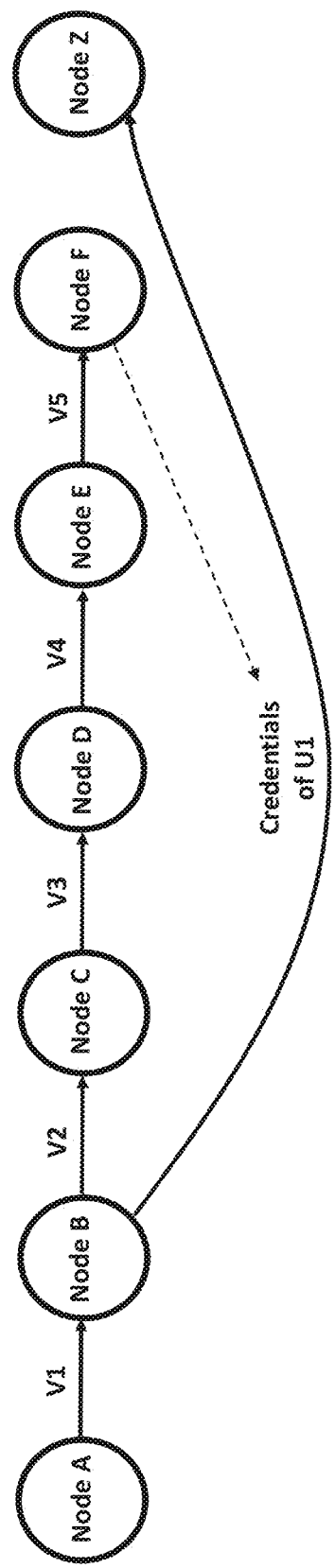
FIG. 12A (PRIOR ART) is a schematic illustration of a representation of an exemplary attack vector using prior art methods of presentation.

In order to clarify the method of FIG. 11, the steps thereof are now applied to an exemplary attack vector shown in FIG. 12A, and to the corresponding array of attacker steps, shown in FIG. 12B.

Step 500—A critical path list L is initialized to be the empty list { }.

Step 502—Node Z is identified as the ending node.

Step 504—Node Z, which is now identified as the ending node, is added to the critical path list L, resulting in list L being {node Z}.

Step 506—The variable Node_Of_Interest is set to be Node Z.

Step 508—The array of attacker steps is searched for an entry whose Target ID is node Z and whose Step Type is "Compromising a node". The search identifies that the last entry in the array satisfies the requirements.

Step 510—"Using credentials of U1" is extracted as the vulnerability used in the identified step, and Node B is extracted as the Source ID for the node from which the identified step originates. Both fields are added to critical path list L, resulting in the list L being {Node Z, Using credentials of U1, Node B}

Step 512—It is evaluated whether Node B can be a starting node of the attack vector. In this example only Node A is assumed to be already-compromised when the campaign starts, and therefore the result of this evaluation is NO (i.e. Node B cannot be a starting node). Consequently, the flow continues to step 514.

Step 514—The variable Node_Of_Interest is set to be Node B.

Step 508 (second iteration)—The array of attacker steps is searched for an entry whose Target ID is node B and whose Step Type is "Compromising a node". The search identifies that the first entry in the array satisfies the requirements.

Step 510 (second iteration)—"V1" is extracted as the vulnerability used in the identified step and Node A is extracted as the Source ID for the node from which the identified step originates. Both fields are added to the critical path list L, resulting in the list being {Node Z, Using credentials of U1, Node B, V1, Node A}

Step 512 (second iteration)—It is evaluated whether Node A can be a starting node of the attack vector. In this example, Node A is indeed assumed to be already-compromised when the campaign starts, and therefore the result of this evaluation is YES (i.e. Node A can be a starting node). Consequently, the flow continues to step 516.

Step 516—The critical path list is reversed, resulting in the final critical path being {Node A, V1, Node B, Using credentials of U1, Node Z}.

Figure 12C:
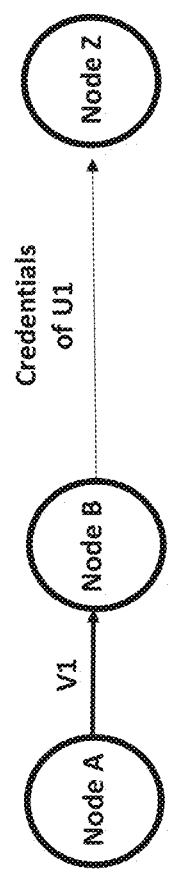
FIG. 12C is a schematic illustration of a representation of the critical path of the attack vector of FIG. 12A, according to an embodiment of the present invention.

The resulting critical path is shown in FIG. 12C. As seen in FIG. 12C, the network nodes included in the critical path are a proper subset of the network nodes included in the full attack vector of FIG. 12A—nodes C, D, E, and F are not part of the critical path. As will be described in further detail hereinbelow, nodes C, D, E, and F form part of an auxiliary path whose purpose is to obtain the credentials of user U1, required in the critical path.

In other embodiments or implementations, the array of attacker steps may first be sorted according to the Target ID field, prior to beginning construction of the critical path. This advantageously accelerates the multiple searches within the array, enabling the use of binary searching instead of the much less efficient linear searching.

In still other embodiments or implementations, the array of attacker steps may first be sorted according to the Step Time field, prior to beginning construction of the critical path. This order also advantageously accelerates the multiple searches within the array, because the Step Time values of sequential attacker steps along the critical path must be in increasing value. Therefore, after an attacker step is added to the critical path, the next attacker step to be added to the critical path (i.e. the attacker step preceding it in the critical path) must have a Step Time value that is earlier, or smaller, than the Step Time value of any attacker step already added to the critical path. Consequently, there is no need for a complete search of the array, and only an earlier portion of the array (up to the entry corresponding to the last added attacker step) need be searched in each iteration.

In still other embodiments or implementations, the array of attacker steps is further pre-processed prior to beginning construction of the critical path, in order to make the iterations even more efficient. For example, the array of attacker steps, or any other data structure used by the attack function of the penetration testing system for providing raw data of the attack, is processed to generate an array of network nodes appearing in the attack vector. An example of such an array, generated from the array of attacker steps of FIG. 12B and corresponding to the attack vector of FIG. 12A, is provided in FIG. 12D. Each entry in the array of network nodes of the attack vector may include:

i. The ID of the network node to which the entry corresponds, labeled as Network Node 520;
  ii. The ID of the network node from which the node corresponding to the entry was compromised, labeled as Attacking Node 522;
  iii. The vulnerability used to compromise the node corresponding to the entry, labeled as Vulnerability 524; and
  iv. Other data about the network node to which the entry corresponds, which is not important for the identification of the critical and auxiliary paths, labeled as Other Data 526.

It is appreciated that in some embodiments, the entries in the array of nodes are sorted according to node IDs in the Network Node column. This enhances the speed of locating specific nodes within the array. In some embodiments, sequential node index numbers are used to represent the network nodes in the sorted array, rather than node IDs, in both the "Network Node" and "Attacking Node" columns. In such embodiments, array searching can be completely avoided. In such implementations, once an index number of a node is located in the "Attacking Node" column, its entry in the array can immediately be accessed, using the node index as an array index. In fact, when node index numbers are used, the "Network Node" column may be omitted from the array. A translation table between node indices and node ID numbers may be used to convert the resulting critical path from one using node indices to one using the familiar node IDs, which may be more comprehensible to the user.

The network node array shown in FIG. 12D includes the node indices in parenthesis.

Figure 13:
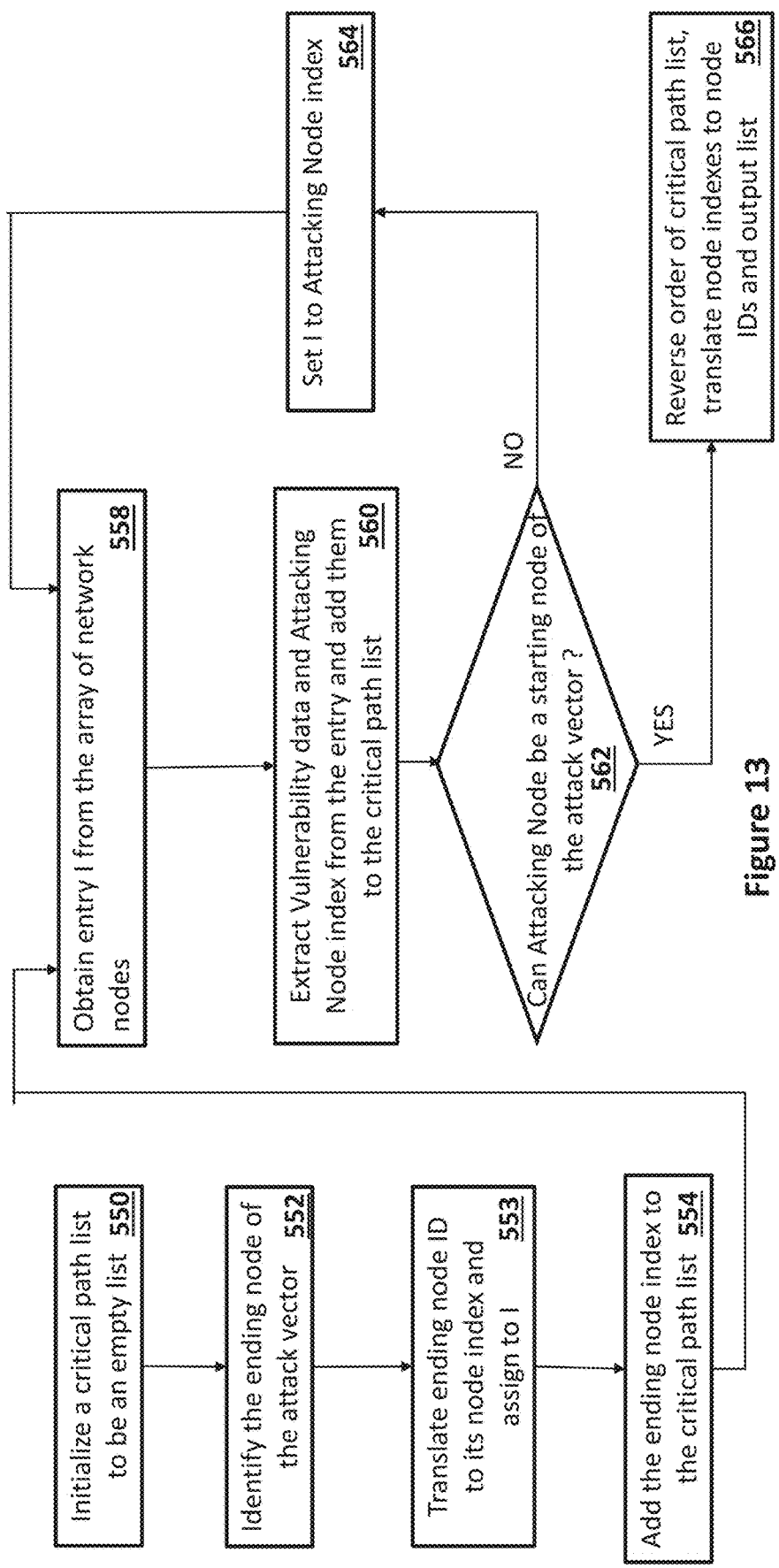
FIG. 13 is a flow chart of a second embodiment of a method for identifying the critical path of an attack vector, as part of the method of FIG. 9, according to an embodiment of the present invention.

FIG. 13 is a flowchart of a method for identifying the critical path of an attack vector, for example by the critical path module 230 (FIG. 8) when executing step 304 (FIG. 9), when using node indices rather than node IDs. The method shown in FIG. 13 is similar to that shown in FIG. 11, but lacks the steps in which the array of attacker steps is searched. This significantly simplifies the process of identifying the critical path.

Initially, at step 550, a critical path list is initialized to be an empty list. The critical path will be gradually constructed by adding vulnerabilities and network nodes to the list.

At step 552, the ending node of the attack vector is identified, substantially as described above with respect to FIG. 11.

At step 553, the node ID of the ending node is translated to the node index corresponding to the node ID of the ending node of the attack vector, which node index is assigned to a variable I, representative of the current node index. The node index corresponding to the ending node is added to the previously empty critical path list at step 554.

At step 558, the entry corresponding to node having index I is obtained from the array of network nodes. This entry provides information about the node, the vulnerability used to compromise the node, and the node from which the current node was attacked.

At step 560, the Vulnerability and the Attacking Node index fields are extracted from the entry of the node I, and are added to the critical path list. At this stage the critical path list contains:
a. the index of the ending node;
b. the vulnerability used for compromising the ending node; and
c. the index of the node used as a source for attacking the ending node.

At step 562, it is evaluated whether the Attacking Node extracted in the previous step, and included in the critical path list, can be a starting node of the attack vector, substantially as described hereinabove with respect to FIG. 11.

If the Attacking Node cannot be a starting node of the attack vector, at step 564 the variable I is set to be equal to the node index of the Attacking Node, and the flow returns to step 558, where the entry relating to the node having index I is obtained from the array of network nodes. Step 560 is completed a second time, and the Vulnerability and Attacking Node index are extracted from the entry relating to the node having index I and are added to the critical path list. After completing step 560 a second time, the critical path list contains:
a. the index of the ending node;
b. the vulnerability used for compromising the ending node;
c. the index of the node used for compromising the ending node ($2^{nd}$ to last node in the critical path);
d. the vulnerability used for compromising the $2^{nd}$ to last node in the critical path; and
e. the index of the node used for compromising the $2^{nd}$ to last node.

The flow continues through steps 558, 560, 562 and 564 as described hereinabove, until an iteration in which, at step 562, it is determined that the Attacking Node can be a starting node of the attack vector. In other words, the iterations continue until the answer to the question in step 562 is YES.

When, at step 562, it is determined that the Attacking Node can be a starting node of the attack vector, it is known that the beginning of the attack vector has been reached, and no further iterations are required. As a result, at step 566, the order of the critical path list is reversed so as to have the starting node at the beginning of the list and the ending node at the end of the list. Additionally, the node indices included in the critical path list are translated to the corresponding node IDs, and the resulting critical path list is provided as the critical path of the attack vector.

For clarity, the steps of the method of FIG. 13 are now applied to the exemplary attack vector of FIG. 12A, using the corresponding array of network nodes illustrated in FIG. 12D.

Step 550—A critical path list L is initialized to be the empty list { }.

Step 552—Node Z is identified as the ending node.

Step 553—The ID of node Z is translated to node index 6 and is assigned to the variable I. As is common in the art of computer science, the indexing in an array starts at zero, and as such the node indices start from index zero.

Step 554—The index of the ending node is added to the critical path list L, resulting in list L containing {Node index 6}.

Step 558—The array of network nodes is accessed, and the entry at index 6 is obtained.

Step 560—"Using credentials of U1" is the Vulnerability value extracted from the obtained entry, and node index 1 is the Attacking Node index extracted from the obtained entry. Both fields are added to the critical path list L, resulting in list L being {Node index 6, Using credentials of U1, Node index 1}

Step 562—It is evaluated whether Node B, which has the node index 1 extracted from the obtained array entry, can be a starting node of the attack vector. In this example only Node A is assumed to be already compromised when the campaign starts, and therefore the result of this evaluation is NO (i.e. Node B cannot be a starting node). Consequently, the flow proceeds to step 564.

Step 564—the index number of the Attacking Node, node B, is assigned to the variable I. As such, the value of variable I is now 1, the index of node B.

Step 558 (second iteration)—The array of network nodes is accessed, and the entry at index 1 is obtained.

Step 560 (second iteration)—"V1" is the Vulnerability value extracted from the obtained entry, and node index 0 is the Attacking Node index extracted from the obtained entry. Both fields are added to the critical path list L, resulting in the list L being {Node index 6, Using credentials of U1, Node index 1, V1, Node index 0}.

Step 562 (second iteration)—It is evaluated whether Node A, which has the node index 0 extracted from the obtained array entry, can be a starting node of the attack vector. In this example Node A is indeed assumed to be already compromised when the campaign starts, and therefore the result of this evaluation is YES (i.e. Node A can be a starting node). Consequently, the flow proceeds to step 566.

Step 566—The critical path list L is reversed, resulting in the final critical path being {Node index 0, V1, Node index 1, Using credentials of U1, Node index 6}.

Finally, the node indices in the critical path list are translated into network node IDs, resulting in the critical path being {Node A, V1, Node B, Using credentials of U1, Node Z}.

In some implementations of the methods of FIGS. 11 and 13, reversal of the critical path list prior to displaying thereof can be avoided by adding vulnerabilities and nodes, at steps 510 and 560, to the beginning of the critical path list rather than to the end of the list.

It is appreciated that the data used for determining the critical path of an attack vector need not necessarily be in the form of an array of attacker steps or an array of network nodes, as in above examples of FIGS. 11 and 13. The data may be represented in any suitable form, provided that all the information required for carrying out the methods of the proposed solution is represented. For example, the data of the attack vector may be provided in the form of a graphical representation of an attack vector, such as that shown in FIG. 4. Alternatively, the data may be provided in the form of a textual representation of an attack vector.

As discussed hereinabove, in some embodiments, the system 200 (FIG. 8) further includes an auxiliary path module 250, which determines one or more auxiliary paths of the attack vector. Similarly, the method of FIG. 9 may include step 310 of determining one or more auxiliary paths of the attack vector, which can be displayed to the user. The determination of auxiliary paths of the attack vector is only carried out following the determination of the critical path, as described herein, since the identification of auxiliary paths is dependent on the identification of the critical path.

Figure 14:
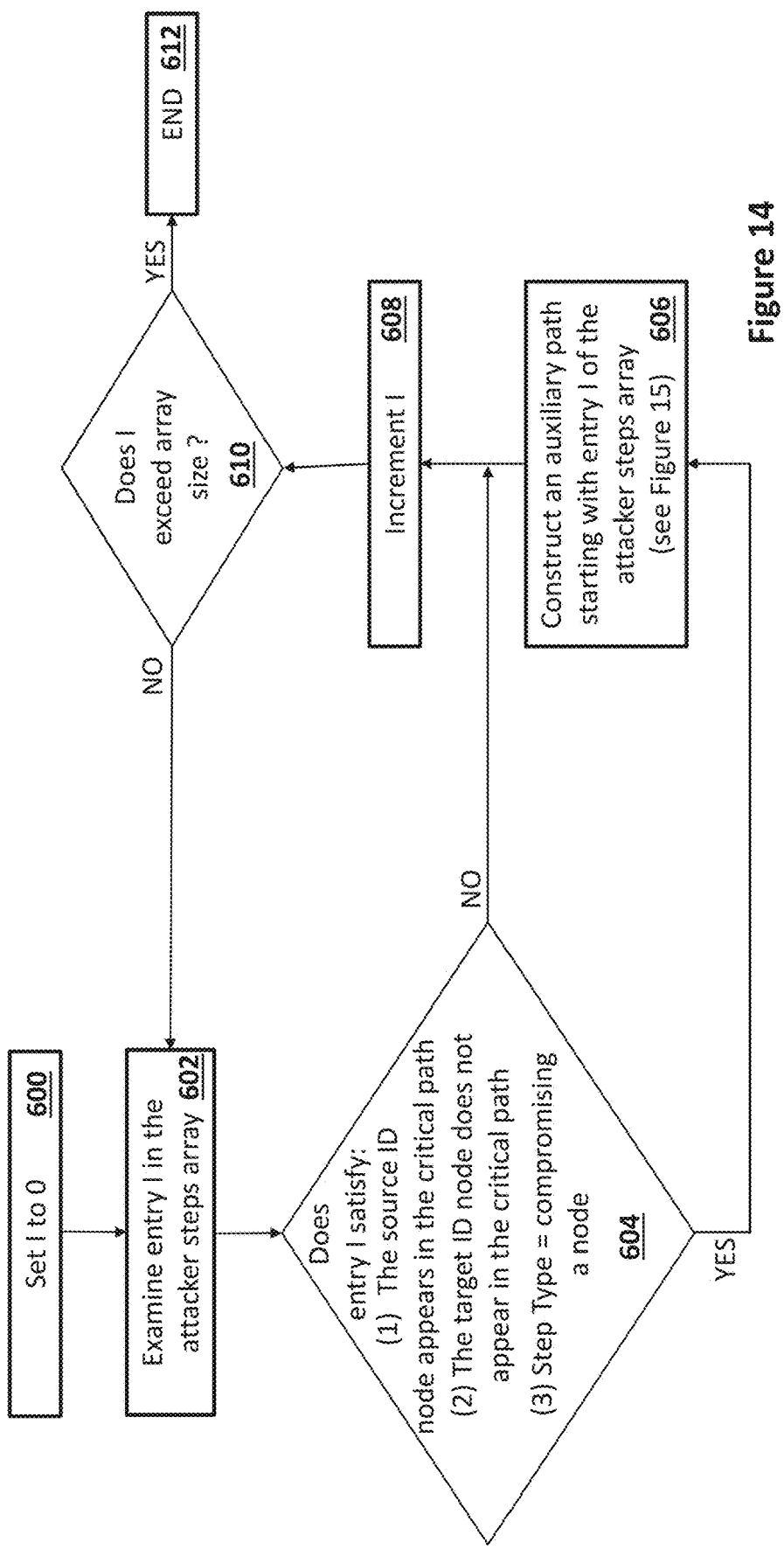
FIG. 14 is a flow chart of a method for identifying attacker steps which are initial attacker steps of an auxiliary path according to an embodiment of the present invention.
Figure 15:
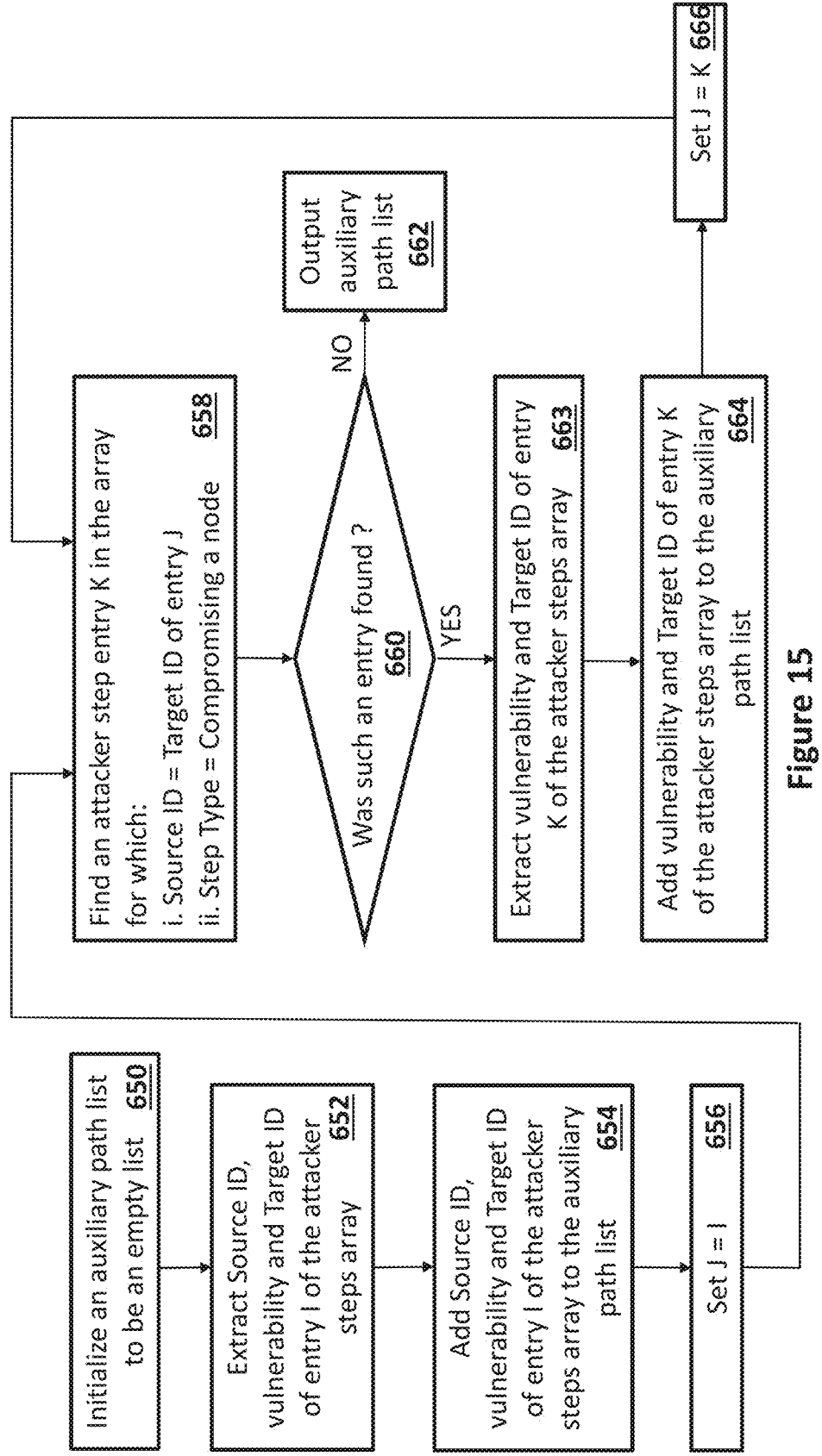
FIG. 15 is a flow chart of a method for constructing, or determining, an auxiliary path, starting at an attacker step identified in FIG. 14, according to an embodiment of the present invention.

FIG. 14 is a flow chart of a method for identifying attacker steps which are initial attacker steps of an auxiliary path according to embodiments of the present invention, and FIG. 15 is a flow chart of a method for constructing, or determining, an auxiliary path, starting at an attacker step identified in FIG. 14, according to embodiments of the present invention. FIGS. 14 and 15 are described herein with respect to the attacker steps array of FIG. 12B, and to the critical path of FIG. 12C, constructed from the attack vector of FIG. 12A using the method of FIG. 11.

As seen in FIG. 14, at an initial step 600, the value of a variable I is set to 0. This index variable is used for scanning the array of attacker steps shown in FIG. 12B, as explained herein.

At step 602, the entry of the array of attacker steps, indexed by the value of variable I, is examined.

Subsequently, at step 604, it is evaluated whether the entry at index I satisfies all of the following conditions:
  i. The Source ID field of the entry appears in the critical path of the attack vector;
  ii. The Target ID field of the entry does not appear in the critical path of the attack vector; and
  iii. The "Step Type" field of the entry indicates that this attacker step corresponds to compromising a network node.

If the result of the evaluation is positive, and the entry at index I satisfies all three conditions, the attacker step at index I is labeled as an attacker step forming the beginning of an auxiliary path. The structure of the auxiliary path beginning at the attacker step at index I is determined at step 606, using the method of FIG. 15, as described hereinbelow, either immediately or at a later stage.

Regardless of whether or not the construction of the auxiliary path is carried out upon identification of the beginning of the auxiliary path, the flow continues to step 608. Additionally, if at evaluation step 604 at least one of the three conditions is not met, the flow continues directly to step 608, skipping step 606. At step 608, the index variable I is incremented. If an evaluation at step 610 shows that index I now exceeds the array size (i.e. it points beyond the edge of the array), the process of constructing auxiliary paths is complete, and the flow ends at step 612. Otherwise, the flow returns to step 602, using the updated index I.

It is appreciated that the method of FIG. 14 may result in zero auxiliary paths, a single auxiliary path, or multiple auxiliary paths. In the event of multiple auxiliary paths, it is possible that a plurality of auxiliary paths will begin in a common starting node.

Figure 17B:
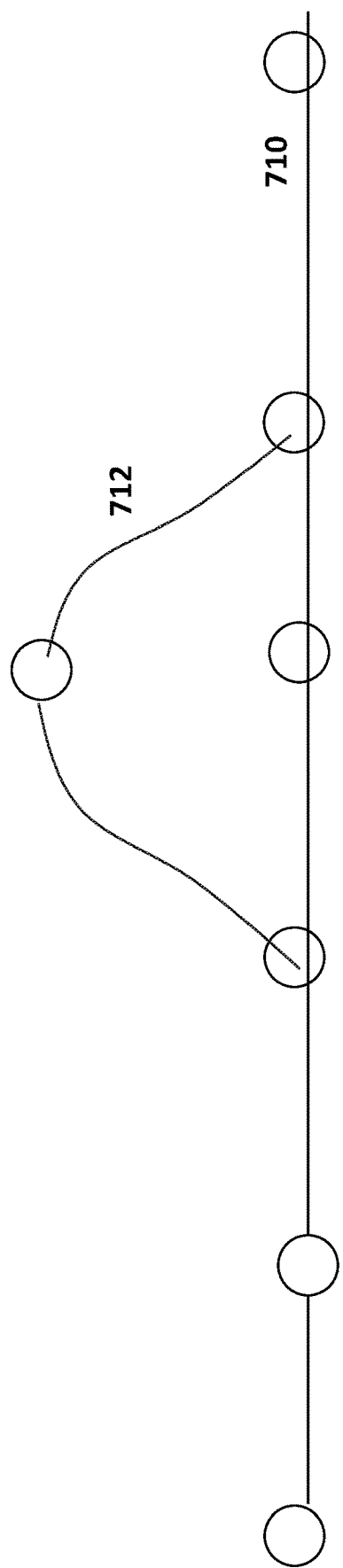
Figure 17C:
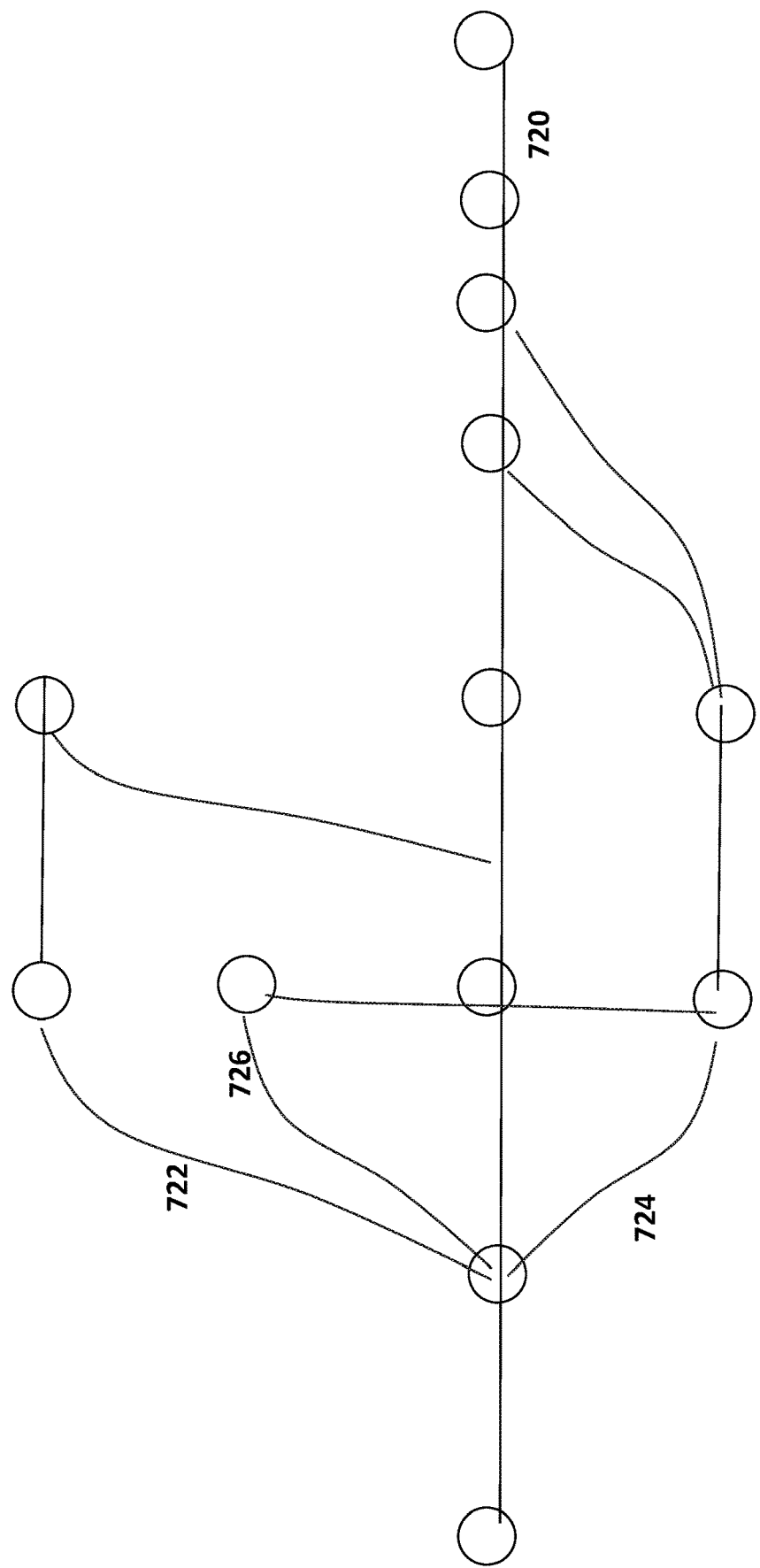
Figure 17D:
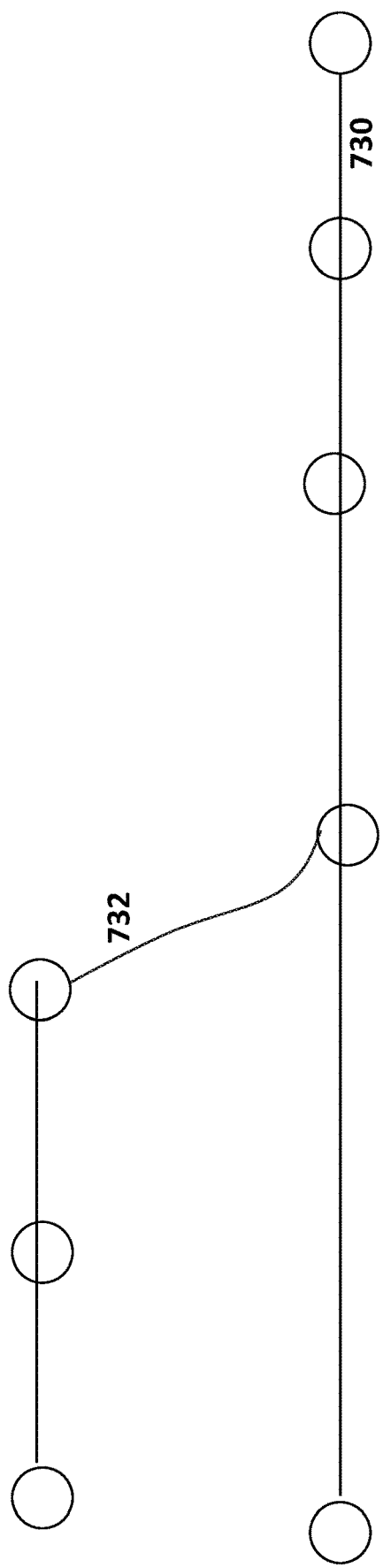

It is further appreciated that, for simplicity, the present disclosure, and specifically the method of FIG. 14 ignore the special case in which a path for obtaining a resource or asset begins in a starting node of the attack vector that is not included in the critical path, as seen for example in FIG. 17D. The methods of the present disclosure, and specially the method of FIG. 14 can be modified to include this additional and unique case, which modification includes modifying step 604 of FIG. 14 to evaluate, in addition to the conditions listed above, whether the currently indexed attacker step meets all of the following conditions:
  i. The Source ID field of the entry at index I is a starting node of the attack vector;
  ii. The Source ID field of the entry at index I does not appear in the critical path of the attack vector; and
  iii. The "Step Type" field of the entry indicates this attacker step corresponds to compromising a network node.

If all three conditions are satisfied, then this attacker step entry is the beginning of a path for obtaining an asset that starts in a second starting node, different from the starting node at the beginning of the critical path. The flow of FIG. 14 continues, following evaluation of these conditions, as described hereinabove.

Reference is now made to FIG. 15, which shows a method of constructing or determining the structure of an auxiliary path starting with an attacker step entry I in the attacker steps array, as required in step 606 of the method of FIG. 14.

At an initial step 650, an auxiliary path list A is initialized to be an empty list. The auxiliary path will be gradually constructed by adding vulnerabilities and network nodes to the list. The construction of the auxiliary path in the method of FIG. 15 is distinct from the construction of a critical path as described with respect to FIGS. 11 and 13, in that the auxiliary path is constructed from its beginning to its end, and not in reverse order.

At step 652, the Source ID field, the vulnerability field and the Target ID field of the attacker step entry at index I of the attacker steps array are extracted. The index I of the initial attacker step is identified at step 604 of the method of FIG. 14, as discussed hereinabove.

The Source ID, Vulnerability and Target ID of entry I of the attacker steps array, as extracted therefrom, are added to the auxiliary path list A at step 654.

At step 656, a second variable J is set to be equal to the value of variable I.

At step 658, the attacker step array is searched for an attacker step entry which satisfies the conditions:
- i. The Source ID field of the entry equals the Target ID of the entry at index J (i.e. the attacker step of the entry can be a following attacker step to that of the entry at index J); and
- ii. The "Step Type" field of the entry indicates that this attacker step corresponds to compromising a network node.

If no entry satisfying the two conditions is found, the construction of the auxiliary path is complete, and the auxiliary path list is provided as output at step 662.

Otherwise, if at step 658 an entry satisfying both conditions is found in the attacker step array, the index of the found entry in the array of attacker steps is assigned to a third variable K. The Vulnerability field and the Target ID field of the entry at index K of the attacker steps array are extracted at step 663, and are added to the auxiliary path list A at step 664.

The value of variable J, which indicates the last attacker step established to be part of the auxiliary path, is updated to be equal to the value of the variable K—the attacker step just added to the auxiliary path, at step 666. The flow then proceeds to step 658, using the data entry at the updated index J.

For clarity, the methods of FIGS. 14 and 15 are applied to the attack vector of FIG. 12A, the corresponding attacker step array of FIG. 12B, and the critical path of FIG. 12C. As discussed hereinabove and clear from FIG. 12C, the critical path of this attack vector includes nodes A, B and Z.

Step 600—variable I is set to 0.

Step 602—entry 0 of the attacker steps array is examined.

Step 604—entry 0 is evaluated to determine whether it satisfies the three conditions. In this case, the Source ID of entry 0 is node A, which appears in the critical path. However, the Target ID of entry 0 is node B, which also appears in the critical path. Therefore, the attacker step at entry 0 does not satisfy all three conditions. Consequently, no auxiliary path is constructed at this iteration, and the flow proceeds to step 608.

Step 608—variable I is incremented from 0 to 1. Since index value 1 is within the array bounds, as evaluated at step 610, the flow loops back to step 602.

Step 602 (second iteration)—entry 1 of the attacker steps array is examined Step 604 (second iteration)—entry 1 is evaluated to determine whether it satisfies the three conditions. In this case, the Source ID of entry 1 is node B, which appears in the critical path, and the Target ID of entry 1 is node C, which does not appear in in the critical path. Thus, the first two conditions are satisfied. Additionally, the Step Type of entry 1 is "compromising a node". As such, all three conditions are satisfied, and at step 606 of FIG. 14 the flow of FIG. 15 is carried out for constructing an auxiliary path beginning with the attacker step of entry 1 of the attacker step array.

At step 606 of the method of FIG. 14, the implementation of the flow of FIG. 15 to entry 1 of the attacker steps array includes:
- A. Step 650—An auxiliary path list A is initialized to the empty list.
- B. Step 652—The Source ID, Vulnerability and Target ID fields of entry 1 of the attacker step array are extracted. In entry 1, these fields are equal to node B, vulnerability V2 and node C, respectively.
- C. Step 654—The three extracted values are added to the auxiliary path list A, resulting in the list A becoming {node B, V2, node C}.
- D. Step 656—variable J is set to be equal to the value of variable I, namely 1.
- E. Step 658—a search is conducted for an entry in the array of attacker steps whose Source ID equals node C and whose Step Type equals "compromising a node", and a third variable K is set to be equal to the entry number, found to be entry 2. At step 660 it is evaluated that a suitable entry, satisfying the conditions, has been found.
- F. Step 663—the Vulnerability and Target ID of entry 2 are extracted as Vulnerability V3 and node D, respectively.
- G. Step 664—the two values extracted from entry 2 are added to the auxiliary path list A, resulting in the list becoming {node B, V2, node C, V3, node D}
- H. Step 666—J is set to the value of K, namely 2, and the flow returns to step 658 for another iteration.
- I. Step 658 (second iteration)—a search is conducted for an entry in the array of attacker steps whose Source ID equals node D and whose Step Type equals "compromising a node", and variable K is set to be equal to the entry number, found to be entry 3. At step 660 it is evaluated that a suitable entry, satisfying the conditions, has been found.
- J. Step 663 (second iteration)—the Vulnerability and Target ID of entry 3 are extracted as Vulnerability V4 and node E, respectively.
- K. Step 664 (second iteration)—the two values extracted from entry 3 are added to the auxiliary path list A, resulting in the list becoming {node B, V2, node C, V3, node D, V4, node E}
- L. Step 666 (second iteration)—J is set to the value of K, namely 3, and the flow returns to step 658 for another iteration.
- M. Step 658 (third iteration)—a search is conducted for an entry in the array of attacker steps whose Source ID equals node E and whose Step Type equals "compromising a node", variable K is set to be equal to the entry number, found to be entry 4. At step 660 it is evaluated that a suitable entry, satisfying the conditions, has been found.
- N. Step 663 (third iteration)—the Vulnerability and Target ID of entry 4 are extracted as vulnerability V5 and node F, respectively.
- O. Step 664 (third iteration)—the two values extracted from entry 4 are added to the auxiliary path list A, resulting in the list becoming {node B, V2, node C, V3, node D, V4, node E, V5, node F}
- P. Step 666 (third iteration)—J is set to the value of K, namely 4, and the flow returns to step 658 for another iteration.
- Q. Step 658 (fourth iteration)—a search is conducted for an entry in the array of attacker steps whose Source ID equals node F and whose Step Type equals "compromising a node". No such entry is found at step 660, and the iterations are over.

In embodiments in which it is desirable to display the resource or asset obtained by the auxiliary path, the Step Type field of the entry having the same node as its source and target, in this case node F, is retained for later use. In the present example, the Step Type field includes the value "Extracting credentials of U1")

R. Step 662—the generated auxiliary path list is provided, in the form of the list {node B, V2, node C, V3, node D, V4, node E, V5, node F}.

Upon completion of the method of FIG. 15 and of step 606 of FIG. 14 (or any other method for determining the structure of the auxiliary path), the flow returns to FIG. 14 with incrementing of the node index I at step 608, and subsequent examination of the array of attacker steps from entry 2, as discussed hereinabove. Entries 2, 3, 4 and 5 do not satisfy the conditions evaluated at step 604 because their Source ID does not appear in the critical path. Similarly, entry 6 does not satisfy the conditions evaluated at step 604 because its Target ID appears in the critical path. Therefore, no other auxiliary paths are constructed, and the attack vector is determined to have a single auxiliary path. The attack vector of FIG. 12A, including the critical path of FIG. 12C and the auxiliary path identified using the methods of FIGS. 14 and 15 is illustrated in FIG. 16.

In other embodiments of the exemplary implementation of a method for identifying auxiliary path(s) of an attack vector, the process of generating the auxiliary paths loops over entries in an array of network nodes included in the critical path, rather than looping over entries in the array of attacker steps. This may be more efficient, as typically there are many more attacker steps in an attack vector than network nodes in the critical path. Many other implementations of methods for constructing the auxiliary path(s) are also possible, and considered within the scope of the present invention.

When using implementations that rely on an array of network nodes instead of on an array of attacker steps, such as an implementation of a method for identifying auxiliary paths, which corresponds to the method of identifying critical paths shown in FIG. 13, the generation of the auxiliary paths must loop over the nodes included in the critical path, as there is no array of attacker steps available for this purpose. Additionally, in such implementations, when identifying nodes by sequential index numbers rather than node ID numbers, as in the method of FIG. 13, searches of the array of network nodes are not required for constructing the auxiliary paths, making such implementations highly efficient.

It is appreciated that, for simplicity, the flowcharts presented above ignore cases in which an auxiliary path starts from another auxiliary path, rather than from the critical path. However, modification of the methods provided herein to handle such "nested auxiliary paths" is straightforward and would be understood by one of skill in the art, using the provided disclosure.

Reference is now made to FIGS. 17A, 17B, 17C, and 17D, which include screen shots of exemplary attack vectors presented in accordance with the present invention.

FIG. 17A is a screen shot presenting an attack vector including six network nodes. The critical path includes four of the six nodes, presented on a horizontal line, indicated by 700. There are two auxiliary paths: (i) path 702 emanating from the first node of the critical path, and (ii) path 704 emanating from the second node of the critical path. Both auxiliary paths are short—each of them includes a single attacker step that compromises a node for obtaining some credentials, with the credentials being used for carrying out an attacker step from the node from which the auxiliary path had emanated.

FIG. 17B is a screen shot presenting an attack vector including seven network nodes. The critical path includes six of the seven nodes, presented on the horizontal line indicated by 710. There is only one auxiliary path 712, emanating from the third node of the critical path. The auxiliary path 712 includes a single attacker step that compromises a node for obtaining some credentials. In this case, the credentials obtained by the auxiliary path are used in two separate places—for carrying out an attacker step from the third node of the critical path and for carrying out an attacker step from the fifth node of the critical path.

FIG. 17C is a screen shot presenting an attack vector including twelve network nodes. The critical path includes seven of the twelve nodes, presented on the horizontal line 720. There are three auxiliary paths:
i. A first auxiliary path 722 that emanates from the second node of the critical path and includes two attacker steps that obtain credentials used for carrying out an attacker step from the fourth node of the critical path;
ii. A second auxiliary path 724 that emanates from the second node of the critical path and includes two attacker steps that obtain credentials which are used for both (i) carrying out an attacker step from the fifth node of the critical path and (ii) carrying out an attacker step from the sixth node of the critical path; and iii. A third auxiliary path 726 that emanates from the second node of the critical path and includes a single attacker step that obtains credentials used for carrying out an attacker step from the second node of the second auxiliary path.

FIG. 17D is a screen shot presenting an attack vector including eight network nodes. The critical path includes five of the eight nodes, presented on the horizontal line indicated by 730. There is a single auxiliary path 732, starting in a starting node of the attack vector which is not included in the critical path, rather than emanating from a node included in the critical path. The auxiliary path 732 includes three attacker steps that obtain credentials used for carrying out an attacker step from the second node of the critical path.

Regardless of the specific implementation used for determining the critical path and the auxiliary paths, the result of use of the present invention is a presentation of an attack vector in a manner that is easier for the user to grasp. The user can immediately see the "core" of the attack, which is the critical path leading from a starting network node of the attack vector to the ending network node of the attack vector which serves as the goal of the attacker. The auxiliary paths do not interfere with the critical path—the user may examine them if he so desires, but they are clearly separated from the "core" of the attack vector. This enables the user to visualize locations of the attack vector that may be "broken" in order to prevent an attack, and may indicate to the user locations for such "breaks" which would be more advantageous than others.

It is appreciated that, while the discussion hereinabove relates to the presentation of a single attack vector, often a penetration testing campaign identifies multiple attack vectors applicable to the tested networked system. In such cases, each of the multiple identified attack vectors is independently presented using the methods of the present invention.

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy. A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "attacker" or "threat actor"—An entity, whether a single person, a group of persons or an organization, that might conduct an attack against a networked system by penetrating it for uncovering its security vulnerabilities and/or for compromising it.

22. "a type of an attacker"—A classification of the attacker that indicates its main incentive in conducting attacks of networked systems. Typical values for a type of an attacker are state-sponsored, opportunistic cyber criminal, organized cyber criminal and insider. An attacker can have only a single type.

23. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

24. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

25. "a lateral movement strategy of an attacker"—A decision logic applied by the attacker of a campaign for selecting the next network node to try to compromise.

During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists).

Typically, an attacker uses a single lateral movement strategy during an attack.

26. "network nodes A and B are immediate neighbors of each other"—Network nodes A and B have a direct communication link between them that does not pass through any other network node.

27. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes.

The communication channel between the two network nodes may be a two-way communication channel, with which each of the two network nodes can send information to the other one. Alternatively, the communication channel may be a one-way communication channel, enabling network node A to send information to network node B, but not the other way around.

28. "accessing a network node"—Communicating with the network node in a way that provides the accessing entity an ability to perform an operation on one or more resources of the network node. For example, when a user logs into a first network node from a second network node, the second network node is accessing the first network node. As another example, when a file is read by a first network node from a shared folder in a second network node, the first network node is accessing the second network node. When a first node is accessing a second node, the second node is being accessed by or from the second network node.

29. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

30. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

31. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

32. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

33. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

34. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

35. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

36. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

37. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

38. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

39. "resource of a network node"—A file in the network node, a folder in the network node, credentials of a user residing in the network node (the credentials not necessarily applying to the network node containing the credentials), a peripheral device of the network node or a communication device accessible to the network node.

40. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

41. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. A user is said to have certain access rights regardless if those rights are conditioned on authentication or not.

The term "access rights" in the plural may be used even if only a single right is involved (e.g. when a user has only a right to read a single file in the network node).

42. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

43. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node.

44. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

45. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

46. "administrator of a network node"—Any person that is authorized, among other things, to define or change at least one rule controlling at least one of an access right, a permission, a priority and a configuration in the network node.

47. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

48. "achieving full control of a computing device"—For a multi-user computing device that distinguishes between administrator and non-administrator users, logging into the computing device with administrator access rights. For a single-user computing device, logging into the computing device as the single user.

49. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

50. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.

For the sake of the above defined terms the singular and plural forms are equivalent—"criterion" and "criteria" are used interchangeably, and so are "condition" and "conditions".

The condition may be a simple condition (for example "the number of already compromised nodes in the tested networked system is five or more") or a compound condition composed of multiple simple conditions and one or more logical operators (for example "a file named company_budget.xls is exported out of the tested networked system from any network node, or at least ten files were encrypted by the attacker in the network node used by the organization's CFO").

A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day.

51. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

53. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

54. "executable file"—A computer file that contains instructions that may be executed by a computer. An executable file may be a binary file (e.g. when containing machine code) or a text file (e.g. when containing interpreted scripting code).

55. "text file"—A computer file that includes mostly text. A text file may include some non-textual content. For example, Microsoft Word files may include some non-textual control characters or metadata but are still considered text files.

56. "binary file"—Any computer file that is not a text file. A binary file may include some textual content. For example, executable files containing machine code may include textual strings that are part of the executable code but are still considered binary files.

57. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

58. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

59. "random selection"—A selection that depends on a random or pseudo-random factor. Different possible outcomes in a random selection do not necessarily have the same probabilities of being selected.

60. "attacker step"—One or more actions performed by an attacker of a networked system in order to achieve a certain result. An attacker step may be included in an actual or potential attempt of an attacker to compromise a networked system that includes one or more attacker steps. Performing a given attacker step may be conditioned on certain achievements being already achieved by the attacker prior to carrying out the given attacker step.

An example of an attacker step that consists of a single action is the recovering of a password enabling access to a given network node from a known hash code (e.g. using a pre-compiled dictionary of hash codes and their corresponding passwords, when the algorithm of hashing is known). In this example, the attacker step is conditioned on a prior achievement by the attacker of finding out the hash code.

An example of an attacker step that consists of multiple actions is the recovering of a password enabling access to a given network node based on an ability to remotely execute arbitrary code in the given network node (e.g. remotely executing in the given network node code that obtains a hash code of a password enabling access to the given network node, and then recovering the corresponding password from its hash code as in the previous example). In this example, the attacker step is conditioned on a prior achievement by the attacker of obtaining an ability to remotely execute arbitrary code in the given network node.

As can be seen from the above examples, the breaking out of a potential attack plan into attacker steps is somewhat arbitrary. The second example above including a single attacker step consisting of two actions could have been defined to include two separate attacker steps, each including a single action—the first attacker step consisting of remotely executing in the given network node code that obtains the hash code, and the second attacker step consisting of recovering the password from its hash code.

61. "attack vector"—A set of network nodes connected by attacker steps. The set represents a method for an attacker to move from one or more starting network nodes to an ending network node. Alternatively, an attack vector can be a set of network nodes connected by vulnerabilities that can be exploited by attacker steps. In this case too, the set represents a method for the attacker to move from one or more starting network nodes to an ending network node.

The starting network node(s) of an attack vector are the network node(s) from which the attacker starts its attack. The ending network node of an attack vector is a network node of the tested networked system whose compromising by the attacker results in achieving the goal set for the attacker in the current penetration testing campaign. The attacker can make progress towards the goal by moving from network node to network node in the attack vector by carrying out the relevant steps exploiting the relevant vulnerabilities.

A starting network node of an attack vector may be a network node of the tested networked system that is assumed to be already compromised at the beginning of the campaign. Alternatively, a starting network node may be a "dummy node" that represents the world outside the tested networked system. This is useful when it is not assumed that any network nodes of the tested networked system are already compromised when starting the campaign. Another way for representing an attack vector that starts outside the tested networked system without explicitly displaying a dummy node is to display the attack vector as starting with an attacker's step or with a vulnerability that can be exploited by an attacker's step, rather than with a network node.

An attack vector may be represented by a graph, where network nodes are represented by graph nodes and steps or vulnerabilities are represented by graph edges. However, this is not the only way of using a graph for representing an attack vector. As one example, steps or vulnerabilities may also be represented by graph nodes, in which case the graph nodes of the attack vector graph alternate between representing network nodes and representing steps/vulnerabilities. Also, a graph is not the only way of representing an attack vector. Other forms, such as a textual list, may also be used for that purpose.

62. "critical path of an attack vector"—A subset of the attack vector, where (i) the subset includes a starting network node of the attack vector, (ii) the subset includes the ending network node of the attack vector, and (iii) the attacker's steps included in the subset (or the attacker's steps exploiting the vulnerabilities included in the subset) form an ordered sequence of steps in which (A) the first step of the sequence is carried out from the starting network node included in the subset, (B) the last step of the sequence compromises the ending network node included in the subset, (C) each step in the sequence compromises a network node that was not previously compromised, and (D) each step in the sequence (except for the first step of the sequence) is carried out from the network node that was compromised by the immediately preceding step in the sequence.

63. "auxiliary path of an attack vector"—A subset of the attack vector, where the attacker's steps included in the subset (or the attacker's steps exploiting the vulnerabilities included in the subset) form an ordered sequence of steps in which (i) the first step of the sequence is carried out from a node included in another path (critical or auxiliary), (ii) the last step of the sequence obtains a resource or an asset that is used in carrying out an attacker step included in another path (critical or auxiliary), (iii) each step in the sequence compromises a network node that was not previously compromised, and (iv) each step in the sequence (except for the first step of the sequence) is carried out from the network node that was compromised by the immediately preceding step in the sequence.

64. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access).

An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action.

Another example of a remediation action that does not make the one or more attacker steps completely unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

65. "a Boolean condition"—A statement that can have a value of either true or false. If the statement is true, we say that the Boolean condition is satisfied. If the statement is false, we say that the Boolean condition is not satisfied.

66. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

67. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

68. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

69. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately, in any other embodiment, or in any suitable combination including only a sub-group of those features.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of displaying an attack vector available to an attacker of a networked system including a plurality of network nodes, the method comprising:
   a. carrying out, by a penetration testing system, one or more penetration tests of the networked system;
   b. based on results of the one or more penetration tests of the networked system, identifying the attack vector available to an attacker of the networked system, the attack vector including a first set of network nodes including multiple network nodes of the networked system that can be compromised by the attacker;
   c. determining a critical path of the attack vector, the critical path including a second set of network nodes including at least two network nodes of the networked system, wherein the second set of network nodes is a proper subset of the first set of network nodes;
   d. displaying the critical path of the attack vector, the displaying of the critical path comprising displaying the network nodes included in the critical path as a continuous ordered sequence of network nodes
   e. determining one or more auxiliary paths of the attack vector, wherein each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes; and
   f. displaying one auxiliary path of the one or more auxiliary paths, the displaying of the one auxiliary path comprising displaying the network nodes included in the one auxiliary path as a second continuous ordered sequence of network nodes.

2. The method of claim 1, wherein the displaying of the critical path of the attack vector further comprises displaying connections between the network nodes included in the critical path, the connections corresponding to attacker steps or to vulnerabilities that can be exploited by the attacker steps.

3. The method of claim 1, wherein the displaying of the one auxiliary path further comprises displaying connections between the network nodes included in the one auxiliary path, the connections corresponding to attacker steps or to vulnerabilities that can be exploited by the attacker steps.

4. The method of claim 1, wherein the displaying of the critical path of the attack vector comprises providing a graphical representation of the critical path.

5. The method of claim 1, wherein the displaying of the critical path of the attack vector comprises providing a textual representation of the critical path.

6. The method of claim 1, wherein the determining of the critical path of the attack vector comprises representing the attack vector as an array, where each entry in the array corresponds to an attacker step included in the attack vector.

7. The method of claim 1, wherein the determining of the critical path of the attack vector comprises representing the attack vector an array, where each entry in the array corresponds to a network node included in the attack vector.

8. A system of displaying an attack vector available to an attacker of a networked system including a plurality of network nodes, the system comprising:
   a. a penetration testing module including:
      i. one or more penetration testing processors; and
      ii. a penetration testing non-transitory computer readable storage medium for instructions execution by the one or more penetration testing processors, the penetration testing non-transitory computer readable storage medium having stored instructions to carry out one or more penetration tests of the networked system;
   b. an attack vector module, including:
      i. one or more attack vector processors; and
      ii. an attack vector non-transitory computer readable storage medium for instructions execution by the one or more attack vector processors, the attack vector non-transitory computer readable storage medium having stored instructions to identify the attack vector available to an attacker of the networked system based on results of the one or more penetration tests of the networked system, the attack vector including a first set of network nodes including multiple network nodes of the networked system that can be compromised by the attacker;
   c. a critical path module, including:
      i. one or more critical path processors; and
      ii. a critical path non-transitory computer readable storage medium for instructions execution by the one or more critical path processors, the critical path non-transitory computer readable storage medium having stored instructions to determine a critical path of the attack vector, the critical path including a second set of network nodes including at least two network nodes of the networked system, wherein the second set of network nodes is a proper subset of the first set of network nodes;
   d. a displaying module, including:
      i. one or more displaying processors; and
      ii. a displaying non-transitory computer readable storage medium for instructions execution by the one or more displaying processors, the displaying non-transitory computer readable storage medium having stored instructions to display the critical path of the attack vector, the instructions to display the critical path comprising instructions to display the network nodes included in the critical path as a continuous ordered sequence of network nodes; and
   e. an auxiliary path module, including:
      i. one or more auxiliary path processors; and
      ii. an auxiliary path non-transitory computer readable storage medium for instructions execution by the one or more auxiliary path processors, the auxiliary path non-transitory computer readable storage medium having stored instructions to determine one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes, wherein the displaying non-transitory computer readable storage medium further has stored instructions to display one auxiliary path of the one or more auxiliary paths, the instructions to display the one auxiliary path comprising instructions to display the network nodes included in the one auxiliary path as a second continuous ordered sequence of the network nodes.

9. The system of claim 8, wherein the instructions to display the critical path of the attack vector further comprise instructions to display connections between the network nodes included in the critical path, the connections corresponding to attacker steps or to vulnerabilities that can be exploited by the attacker steps.

10. The system of claim 8, wherein the instructions to display the one auxiliary path further comprise instructions to display connections between the network nodes included in the one auxiliary path, the connections corresponding to attacker steps or to vulnerabilities that can be exploited by the attacker steps.

11. The system of claim 8, further comprising an auxiliary path module, including:
   i. one or more auxiliary path processors; and
   ii. an auxiliary path non-transitory computer readable storage medium for instructions execution by the one or more auxiliary path processors, the auxiliary path non-transitory computer readable storage medium having stored instructions to determine one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes, wherein the displaying non-transitory computer readable storage medium further has stored instructions to display each auxiliary path of the one or more auxiliary paths, wherein for each given auxiliary path of the one or more auxiliary paths, the instructions to display the given auxiliary path comprise instructions to display the network nodes included in the given auxiliary path as a corresponding continuous ordered sequence of network nodes.

12. The system of claim 8, wherein the instructions to display the critical path of the attack vector comprise instructions to provide a graphical representation of the critical path.

13. The system of claim 8, wherein the instructions to display the critical path of the attack vector comprise instructions to provide a textual representation of the critical path.

14. The system of claim 8, wherein the instructions to determine the critical path of the attack vector comprise instructions to represent the attack vector as an array, where each entry in the array corresponds to an attacker step included in the attack vector.

15. The system of claim 8, wherein the instructions to determine the critical path of the attack vector comprise instructions to represent the attack vector an array, where each entry in the array corresponds to a network node included in the attack vector.

16. The system of claim 8, wherein the critical path module and the displaying module are implemented as a single module.

17. The system of claim 8, wherein the attack vector module and the critical path module are implemented as a single module.

18. A method of displaying an attack vector available to an attacker of a networked system including a plurality of network nodes, the method comprising:
   a. carrying out, by a penetration testing system, one or more penetration tests of the networked system;
   b. based on results of the one or more penetration tests of the networked system, identifying the attack vector available to an attacker of the networked system, the attack vector including a first set of network nodes including multiple network nodes of the networked system that can be compromised by the attacker;
   c. determining a critical path of the attack vector, the critical path including a second set of network nodes including at least two network nodes of the networked system, wherein the second set of network nodes is a proper subset of the first set of network nodes;
   d. displaying the critical path of the attack vector, the displaying of the critical path comprising displaying the network nodes included in the critical path as a continuous ordered sequence of network nodes;
   e. determining one or more auxiliary paths of the attack vector, wherein for each given auxiliary path of the one or more auxiliary paths: (i) the given auxiliary path includes a corresponding third set of network nodes of the networked system, and (ii) the corresponding third set of network nodes included in the given auxiliary path is a proper subset of the first set of network nodes; and
   f. displaying each auxiliary path of the one or more auxiliary paths, wherein for each given auxiliary path of the one or more auxiliary paths, the displaying of the given auxiliary path comprises displaying the network nodes included in the given auxiliary path as a corresponding continuous ordered sequence of network nodes.

* * * * *